(12) United States Patent
Li et al.

(10) Patent No.: US 7,928,669 B2
(45) Date of Patent: Apr. 19, 2011

(54) COLOR CONTROL OF A DISCHARGE LAMP DURING DIMMING

(75) Inventors: Jianwu Li, Solon, OH (US); Alan G. Chalmers, Akron, OH (US)

(73) Assignee: General Electric Company, Schenectady, NY (US)

( * ) Notice: Subject to any disclaimer, the term of this patent is extended or adjusted under 35 U.S.C. 154(b) by 585 days.

(21) Appl. No.: 12/028,068

(22) Filed: Feb. 8, 2008

(65) Prior Publication Data

US 2009/0200954 A1  Aug. 13, 2009

(51) Int. Cl.
H05B 37/02  (2006.01)

(52) U.S. Cl. ........................................ 315/308; 315/246

(58) Field of Classification Search ................ 315/56, 315/160, 246, 270, 271, 291, 307–309, DIG. 4
See application file for complete search history.

(56) References Cited

U.S. PATENT DOCUMENTS

| | | | |
|---|---|---|---|
| 3,484,640 A | 12/1969 | Johnson | |
| 5,256,940 A | 10/1993 | Wada et al. | |
| 5,483,126 A | 1/1996 | Boenigk et al. | |
| 5,973,453 A | 10/1999 | VanVliet et al. | |
| 6,441,564 B1 * | 8/2002 | Gu et al. | 315/291 |
| 6,791,285 B2 * | 9/2004 | Greenwood et al. | 315/307 |
| 7,049,768 B1 | 5/2006 | Zhu et al. | |
| 7,250,732 B2 | 7/2007 | Rahmane et al. | |
| 7,310,293 B2 * | 12/2007 | Senga et al. | 369/47.53 |
| 2006/0232220 A1 | 10/2006 | Melis | |
| 2006/0290292 A1 | 12/2006 | Li et al. | |
| 2007/0090769 A1 | 4/2007 | Collins et al. | |
| 2007/0096662 A1 | 5/2007 | Ribarich et al. | |

FOREIGN PATENT DOCUMENTS

| | | |
|---|---|---|
| GB | 1 502 612 | 3/1978 |
| WO | WO 98/25294 | 6/1998 |
| WO | WO 2004/045257 A1 | 5/2004 |
| WO | WO 2005/006819 | 1/2005 |
| WO | WO 2005/109968 A1 | 11/2005 |

OTHER PUBLICATIONS

PCT/US2009/030702, International Search Report, mailed Mar. 18, 2009.

* cited by examiner

*Primary Examiner* — Jacob Y Choi
*Assistant Examiner* — Jimmy T Vu
(74) *Attorney, Agent, or Firm* — Fay Sharpe LLP

(57) ABSTRACT

A ballast circuit is suitable for driving a high intensity discharge lamp in at least two power modes including a nominal power mode for driving the high intensity discharge lamp at a nominal power and a reduced power dimming mode for driving the lamp at less than the nominal power. The lamp ballast circuit generates a first alternating current waveform during the nominal power mode and generates a background alternating current waveform in the reduced power mode which is perturbed at intervals by a high intensity pulse which helps to reduce the change in correlated color temperature which would otherwise occur in the dimming mode.

35 Claims, 23 Drawing Sheets

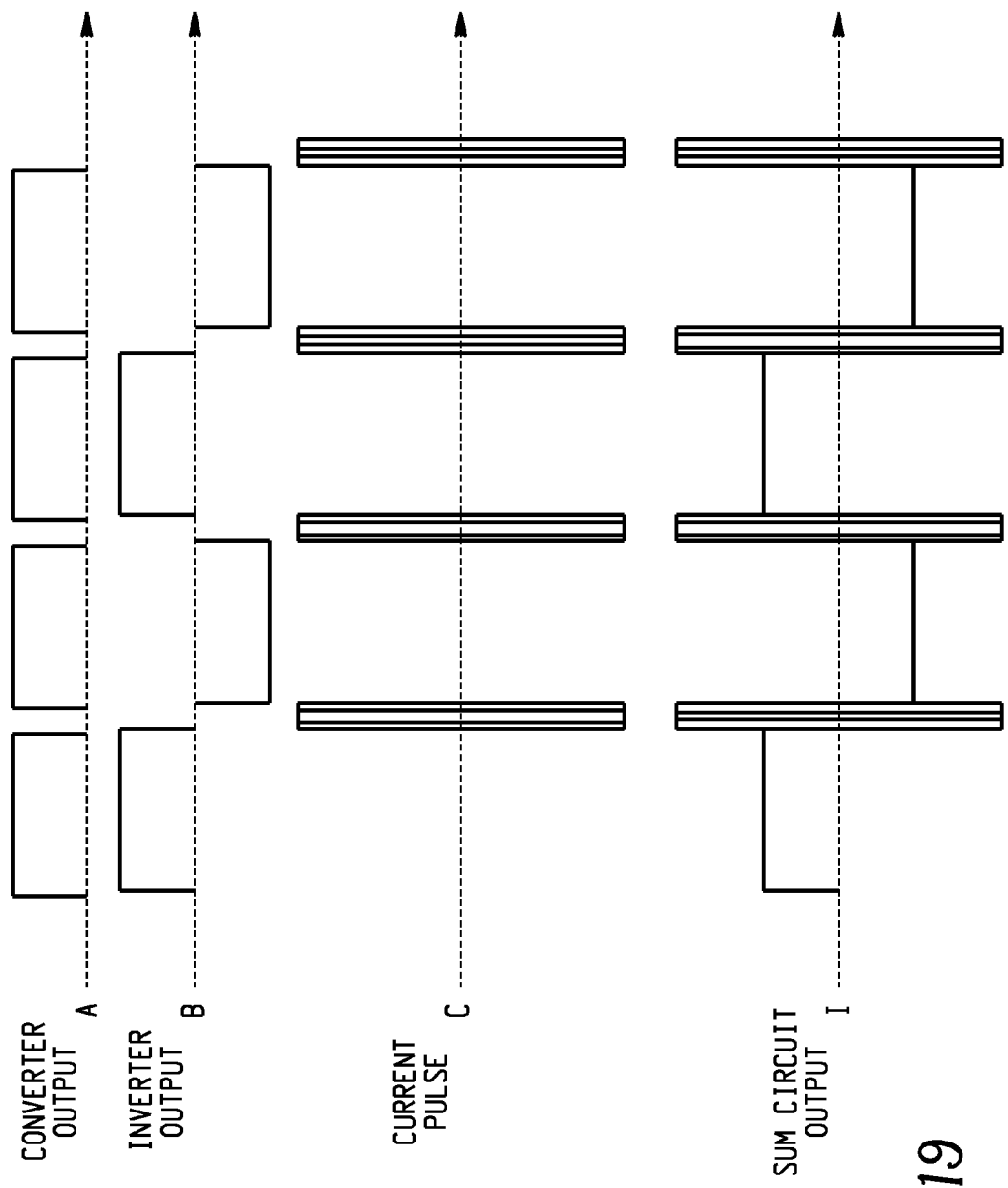

COLOR CONTROL OF A DISCHARGE LAMP DURING DIMMING

BACKGROUND OF THE INVENTION

The exemplary embodiment relates to color control of a discharge lamp during dimming. It finds particular application in connection with a ballast circuit for driving a high intensity discharge lamp which imposes pulses on a dimming waveform to approximate a lamp color exhibited during normal operation.

Discharge lamps produce light by ionizing a vapor fill material, such as a mixture of rare gases, metal halides, and mercury, with an electric arc passing between two electrodes. The electrodes and the fill material are sealed within a translucent or transparent discharge vessel that maintains the pressure of the energized fill material and allows the emitted light to pass through it. During operation, a voltage is applied across the electrodes, and a gas discharge occurs in the ionized fill between the electrodes.

High Intensity Discharge (HID) lamps are high-efficiency lamps that can generate large amounts of light from a relatively small source. These lamps are widely used in many applications, including indoor lighting, highway and street lighting, lighting of large venues such as sports stadiums, floodlighting of buildings, shops, industrial buildings, and projectors, to name but a few. The term "HID lamp" is used to denote different kinds of lamps. These include mercury vapor lamps, metal halide lamps, and sodium lamps. Ceramic metal halide discharge lamps, which are characterized by high efficacy and superior color rendering index (CRI), are now widely used for general lighting.

A ballast circuit provides a current waveform that maintains a suitable lamp operating voltage/current during lamp operation. While a low-pressure gas discharge lamp is typically operated with resonant current, i.e. current having a sine-shaped waveform, a high-pressure discharge lamp is typically operated by supplying commutating DC current. An electronic ballast or driver for such a lamp typically comprises an input for receiving AC mains power, a rectifier for rectifying the AC mains voltage to a rectified DC voltage, and a commutator for regularly changing the direction of this DC current. Typically, the commutator operates at a frequency of about 100 Hz. The lamp is operated at a substantially constant current intensity with the lamp current regularly changing its direction within a very brief time (commutating periods). The waveform may thus approximate a square wave.

HID lamps, and in particular, ceramic metal halide discharge lamps used for general lighting, are generally operated at full rated lamp power. This is because the correlated color temperature (CCT) and hue of the lamp change significantly at lower power. At lower power, the lower temperature of the discharge vessel causes a reduction in the vapor pressure of the metal halide fill in the arc discharge chamber, resulting in significant changes of the CCT of the lamp.

Due to the ever increasing cost of energy and increased interest in energy-conserving lighting systems, there is an interest in providing metal halide discharge lamp systems with the capability of operating at less than full power, referred to as dimming. Ballast circuits have been developed which apply a DC waveform during dimming, as disclosed, for example, in US Pub. No. 20070090769 to Collins, et al. Another method involves varying the duty cycle, as disclosed for example in U.S. Pat. No. 7,049,768. One disadvantage of such methods is that the waveform has a distinct DC component and the electrodes are heated asymmetrically. To compensate for the effect of uneven heating on the electrode life, the two electrodes may be constructed differently. However, this can lead to increased production costs and more complex processing.

There remains a need for a ballast circuit capable of driving an HID lamp in a lower power mode which overcomes the above-referenced problems, and others.

BRIEF DESCRIPTION OF THE INVENTION

In accordance with one aspect of the exemplary embodiment, a lamp ballast circuit includes a nominal power mode for driving a high intensity discharge lamp at a nominal power, the lamp ballast circuit configured to generate a first alternating current waveform during the nominal power mode, and a reduced power dimming mode for driving the lamp at less than the nominal power, the lamp ballast circuit configured to generate a background alternating current waveform which is perturbed at intervals by a high intensity pulse.

In another aspect, a method of operating a high intensity discharge lamp, includes, in a nominal power mode, driving a high intensity discharge lamp at a nominal power with a first alternating current waveform and, in a reduced power dimming mode, driving the lamp at less than the nominal power with a background alternating current waveform which is perturbed at intervals by a high intensity pulse.

In another aspect, a lamp ballast circuit includes a nominal power mode for driving a high intensity discharge lamp at a nominal power, the lamp ballast circuit configured to generate an alternating square waveform during the nominal power mode and a reduced power dimming mode for driving the lamp at less than the nominal power. The lamp ballast circuit is configured to generate a background alternating square waveform in the dimming mode which is periodically perturbed by at least one high intensity pulse, whereby in the dimming mode, the lamp has a correlated color temperature which is closer to that of the lamp in the nominal power mode than the correlated color temperature would be in the absence of the high intensity pulse.

An advantage of one aspect of the exemplary embodiment is the provision of a ballast circuit for an HID lamp which allows the lamp to be operated at less than full power while retaining lamp color properties which approximate those of the lamp operating at full power.

Another advantage of one aspect of the exemplary embodiment is that it enables a metal halide lamp to be operated at about 50% power without appreciably changing the CCT of the lamp output.

BRIEF DESCRIPTION OF THE DRAWINGS

FIG. 19 illustrates exemplary plots of the AC/DC converter output, inverter output, current pulse, and sum circuit output, vs. time, for the exemplary ballast circuit of FIG. 18 for generation of a dimming waveform in accordance with a first aspect of the exemplary embodiment;

DETAILED DESCRIPTION OF THE INVENTION

The exemplary embodiment relates to a ballast circuit for a dimmable lamp, i.e., one which can be operated at a power below the nominal (full) power, such that the lamp will generate less light than the nominal light output. The ballast circuit generates a first alternating waveform for a first mode of operation for driving a lamp at a first operating power (full power operation) and a second alternating waveform for a second mode of operation for driving the lamp at a second operating power lower than the first operating power (dimmed power operation). The first waveform has a first intensity. The second waveform periodically imposes a high intensity alternating current pulse on an alternating waveform of lower intensity than the first intensity. The high intensity pulse has an intensity which is at least as high, if not higher, than the first intensity. In this way, the lamp color properties (e.g., as expressed in terms of the CCT) at dimmed power more closely approximate those of the lamp operating at full power than if the lamp were to be driven by an alternating waveform of lower intensity than the first waveform.

The dimming level is defined as the ratio between dimmed operating power and nominal lamp power. For example, for a lamp with a nominal lamp power of 70 W, when run at 49 W, the dimming level is 70%. This may correspond to a light output, in lumens, of about 60% of that at nominal power. For the same 70 W lamp when run at 35 W, the dimming level is 50% power. This may correspond to a light output, in lumens, of about 40% of that at nominal power.

CCT refers to the correlated color temperature of the lamp, which is the color temperature of a black body radiator (the theoretical perfect radiator) which the human eye perceives as most closely matching the light from the lamp. CCT is generally expressed in degrees Kelvin (K). For a 70 W HID lamp operating at full power, the CCT may be about 3000K. When the same lamp is run at lower power, without the imposed pulse, e.g., a dimming level of 50%, the lamp generally has a higher CCT, which can give the light from the lamp a blue hue.

Intensity I refers to the mean current of an alternating current waveform cycle (ignoring its positive or negative aspects). For a pure square waveform, the intensity is the maximum current. As will be appreciated, in reality, no generated waveform is a pure square wave since there is always a finite time between the negative and positive current outputs. However, for purposes of this disclosure, waveforms which approximate square waves (e.g., commutated DC current waveforms) will be referred to as such.

Figure 1:
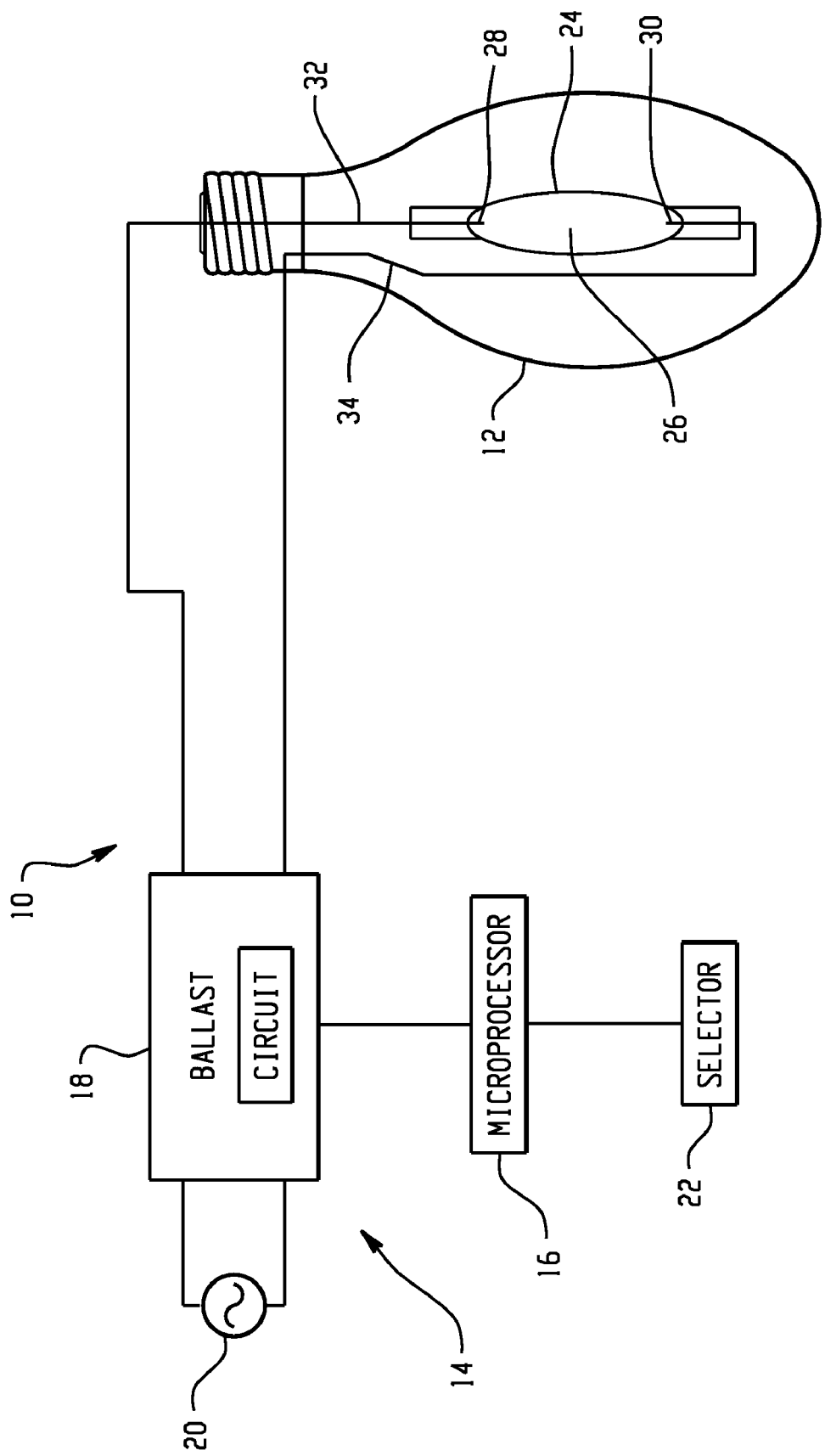
FIG. 1 is a schematic representation of a metal halide lamp and ballast circuit configuration according to one exemplary embodiment.

With reference to FIG. 1, a schematic representation of an exemplary lamp ballast circuit 10 for powering a discharge lamp 12 is shown. The circuit 10 includes a ballast 14 for driving the lamp 12. The exemplary ballast 14 includes a controller 16, such as a microprocessor, and electronic circuitry 18 configured to generate a waveform in response to instructions from the microprocessor 16, according to one embodiment of this disclosure. The exemplary ballast 14 provides an improved color rendering during the reduced power dimming mode of the lamp 12. A source of power 20, such as an AC source, is connected with the ballast circuit 10. A selector 22, such as a hand operated dimmer switch or an automated control system which may respond to time of day or ambient conditions, is used to select a dimming mode. The dimming mode may be a variable mode in which the power is variable between low power (e.g., about a 30% dimming level) and close to full power (e.g., about 90% dimming level or above).

The exemplary lamp 12 is a high intensity discharge (HID) lamp such as a metal halide lamp, e.g., ceramic metal halide (CMH) lamp, or a sodium lamp. The lamp includes a discharge vessel or arc tube 24, which defines an interior chamber 26. The vessel may be formed of a ceramic material, such as alumina, or other suitable light-transmissive material, such as quartz glass. An ionizable fill is sealed in the interior chamber 26. Tungsten electrodes 28, 30 are positioned at opposite ends of the discharge vessel so as to energize the fill when an electric current is applied thereto. The two electrodes 28 and 30 are fed with an alternating electric current via electrical conductors 32, 34 connected with the ballast circuit. When the HID lamp 12 is powered, indicating a flow of current to the lamp, a voltage difference is created across the two electrodes 28, 30. This voltage difference causes an arc across the gap between tips of the electrodes. The arc results in a plasma discharge in the region between the electrode tips.

In the case of a metal halide lamp, the fill may include a dose component, optionally mercury, and a buffer gas. The dose component may include one or more metal halides, such as halides of alkali metals, alkaline earth metals, transition elements, rare earth elements, elements of group III of the periodic table, and combinations thereof. The buffer gas may include xenon, argon, krypton, or a combination thereof. The dose components (halides) are generally present in amounts sufficient to create a saturated vapor such that changes in lamp operating temperature influence vapor pressure of the halides and their corresponding color outputs.

The ballast circuit 10 is configured to generate a first AC waveform during the first power mode (a nominal operating power or "full power") and a second AC waveform during the second, reduced power mode (dimming mode). In general the AC waveform in each power mode has no or virtually no DC component (the mean current is zero), which means that, on average, each electrode receives the same current and thus the electrodes are heated symmetrically.

Figure 2:
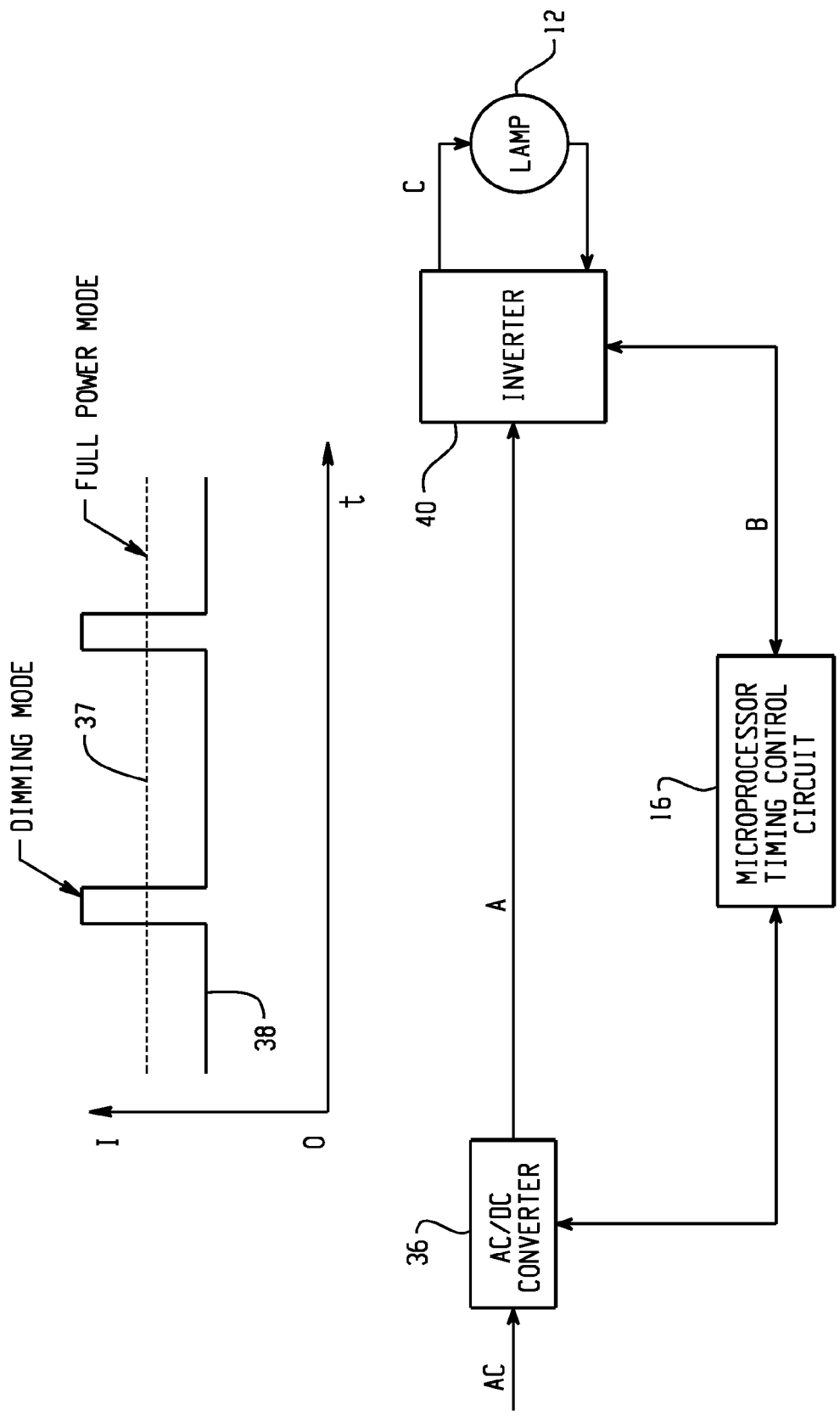
FIG. 2 is a schematic representation of one embodiment of the ballast circuit of FIG. 1.
Figure 3:
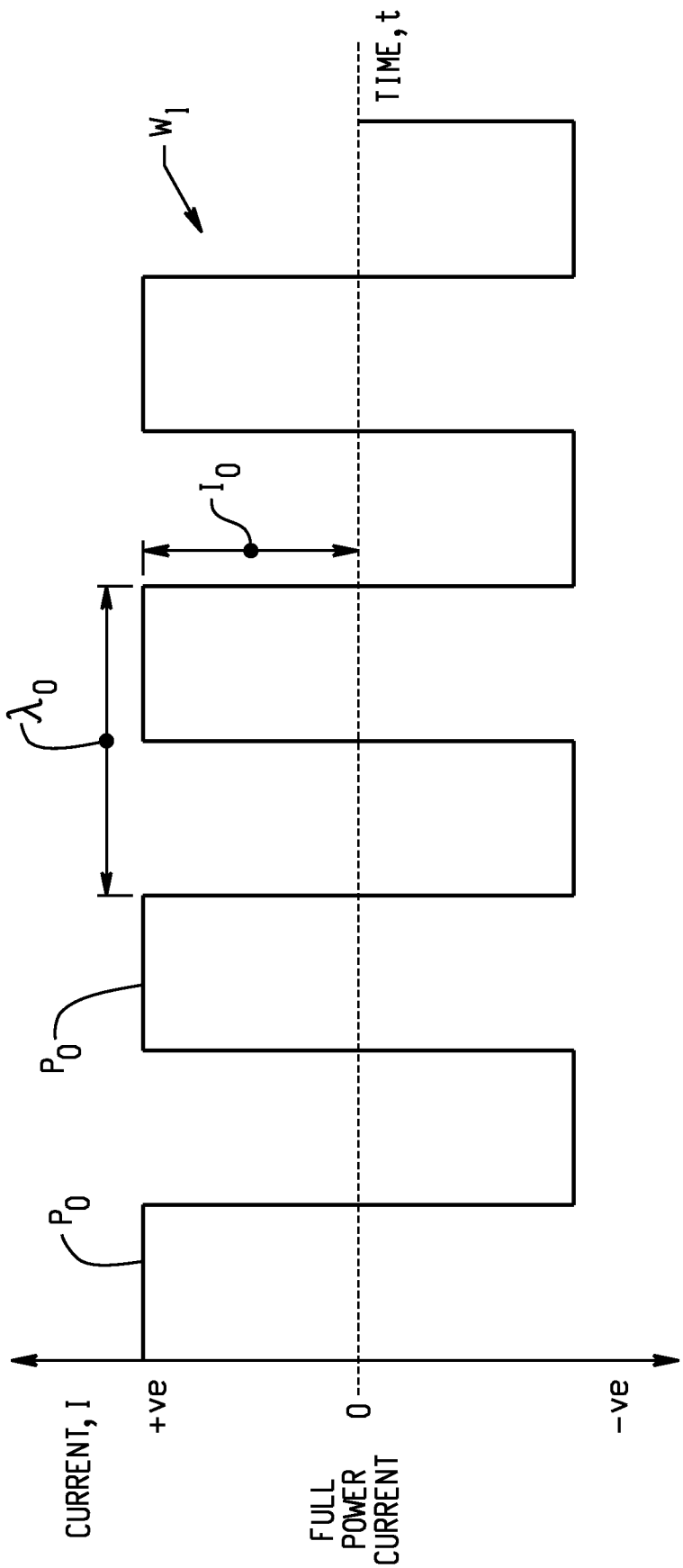
FIG. 3 illustrates a schematic plot of a waveform (current vs. time) for operating the exemplary lamp at full power.
Figure 4:
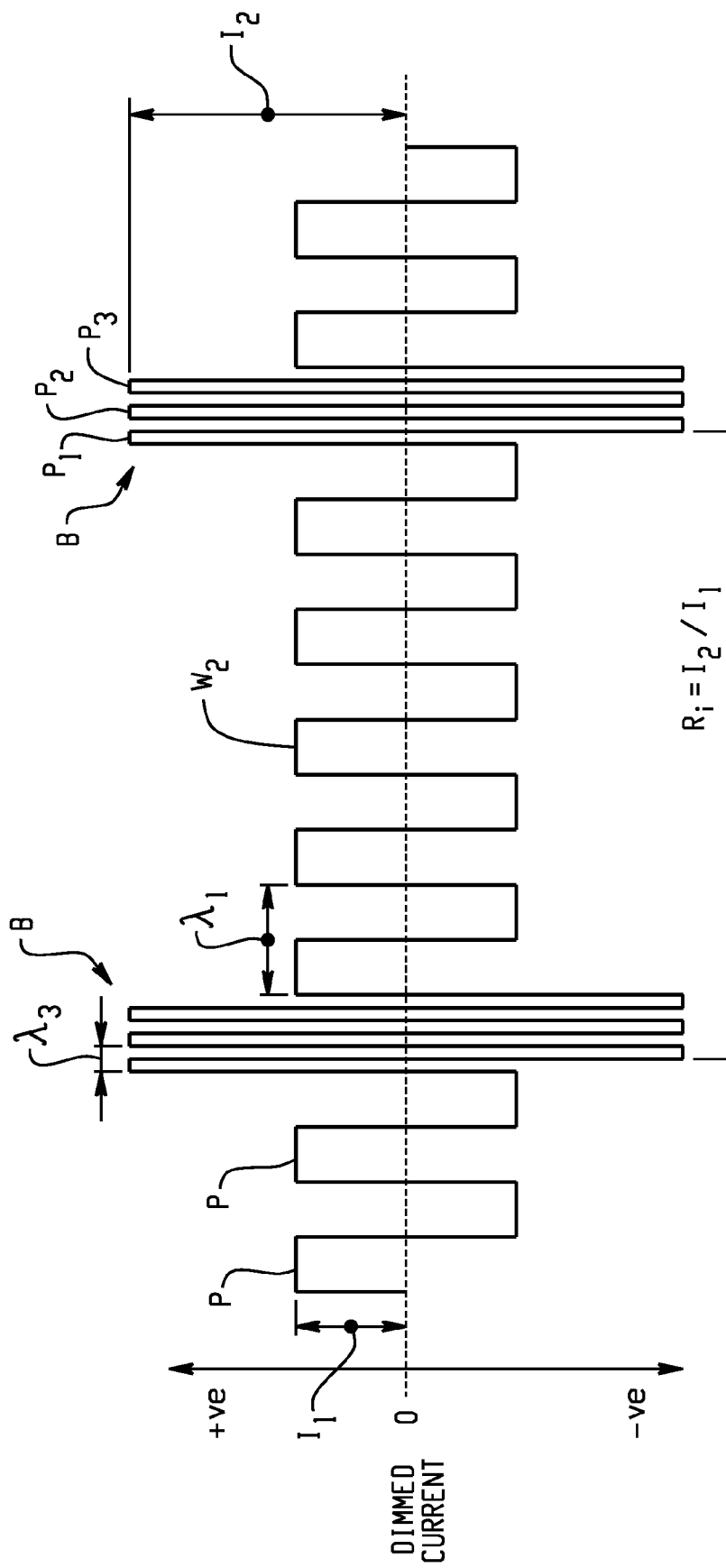
FIG. 4 illustrates a schematic plot of a first exemplary waveform for operating the exemplary lamp at less than full power in a dimming mode with a burst of pulses commencing after the end of a half cycle of an alternating lamp current background square wave.

FIG. 2 illustrates components of exemplary ballast 18 which may be used in generating the exemplary waveforms shown in FIGS. 3 and 4. The exemplary circuit includes an AC/DC converter 36. The output of the converter is represented as reference character A. In the full power mode, the converter converts input AC current from the source 20 into a constant DC current 37. In the dimming mode, the converter converts input AC current from the source 20 into a special DC output 38. The circuit further includes an inverter 40, which receives as input, the output A of the AC/DC converter 36. The inverter inverts the current, at intervals controlled by the timing signal B from microprocessor 16, to provide a current waveform indicated by reference character C, which may be of the type shown in FIG. 3 for full power mode or FIG. 4 in dimming mode. The waveform C is supplied to the lamp. Both the timing of AC/DC converter 36 and inverter 40 are under the control of the microprocessor 16.

Figure 5A:
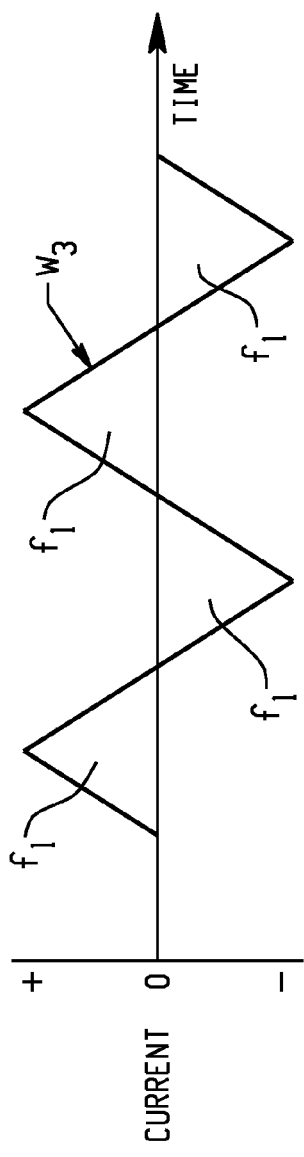
FIGS. 5A, 5B, and 5C illustrate alternative shapes (triangle, sawtooth, and exponential) for the waveforms of FIGS. 3 and 4.
Figure 5B:
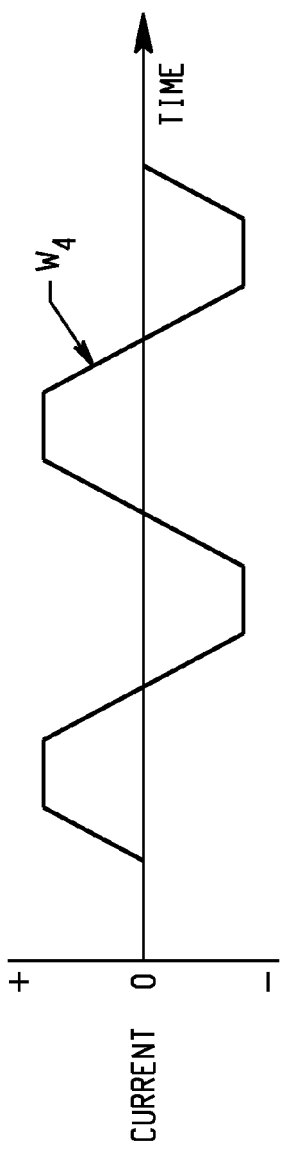
Figure 5C:
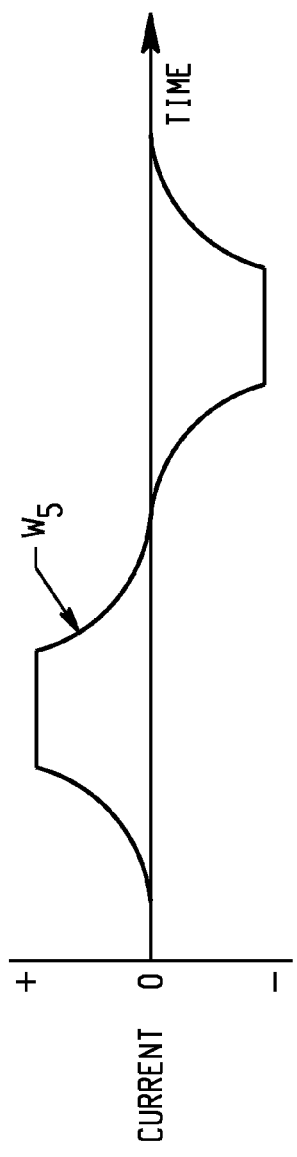

FIG. 3 illustrates an exemplary first waveform $W_1$ (current vs. time) that can be generated by the exemplary ballast 14, which may be used in the full power mode. FIG. 4 illustrates an exemplary waveform $W_2$ that may be used in the second power mode (dimming mode). The illustrated waveforms $W_1$, $W_2$ are, in both modes, based on a square wave, although it is also contemplated that other waveforms such as triangle, sawtooth, exponential, or the like may be employed for the high intensity pulses (and optionally also for the background pulses), as illustrated in waveforms $W_3$-$W_5$ shown in FIGS. 5A, 5B, and 5C.

In the first power mode (FIG. 3), the current has a first intensity $I_0$. Since the waveform is square, the current alternates between maximum and minimum intensity $I_0$. As can be seen, the waveform has a periodic cycle with a first wavelength $\lambda_0$. Each cycle includes a positive and a negative half cycle or pulse $P_0$ of short duration (each approx $\lambda_0/2$). The first wavelength $\lambda_0=1/f_0$ where $f_0$ is the frequency. Frequency can be expressed in terms of cycles/second (Hz). The frequency $f_0$ may be for example, from about 60-1000 Hz, e.g., about 100 Hz.

In the second power mode (FIG. 4), the waveform includes first and second waveforms. A first waveform (background waveform) is an alternating square wave, which includes positive and negative pulses (half cycles) of a second intensity $I_1$, which is lower than the first intensity $I_0$. The ratio of $I_1:I_0$ selected is largely dependent on the desired dimming level and can be, for example, less than 1, e.g., from about 0.1:1 to about 0.9:1. A second waveform is an alternating current rectangular pulse waveform having positive portions and negative portions of higher intensity than the pulses of the first waveform. The regular background pulse is thus perturbed at intervals, by a pulse of higher intensity. Specifically, the pulses in the background waveform have a second wavelength $\lambda_1$. $\lambda_1$ may be the same as that of the first wavelength, i.e., the second wavelength $\lambda_1$ may equal $\lambda_0$ (and thus the background frequency $f_1=f_0$). However, it is not necessary for the wavelengths to be the same. Superimposed on these pulses at an interval $\lambda_2$, is an intensity burst B comprising at least one and generally a plurality of sequential high intensity alternating current pulses $P_1$, $P_2$, $P_3$, etc. for each polarity, each pulse having an intensity $I_2$. The pulses are thus grouped together, so that each subsequent pulse in the burst follows directly from the preceding one without interposing one of the pulses P. In general, $I_2$ is greater than $I_1$ and as illustrated, may be greater than $I_0$. The current ratio $R_i$ is defined as the mean amplitude of the current pulse to the mean amplitude of the alternating background lamp current. The ratio $R_i=I_2/I_1$ (ratio of the intensity of the pulses in the burst to the intensity of the pulse in the background waveform $W_2$) may be, for example, from about $1<R_i\leq4$. In one embodiment, $R_i$ is greater than 1.2, e.g., $\geq1.5$. In another embodiment, $R_i\leq3$. The ratio $R_i$ may remain constant for all dimming levels, i.e., as the intensity $I_1$ is decreased, the intensity $I_2$ decreases correspondingly.

The interval $\lambda_2$ of the high intensity burst B may be equal to or greater than $\lambda_1/2$. For example, $\lambda_2\geq2\lambda_1$ and in some embodiments $\lambda_2 \geq 4\lambda_1$. In some embodiments, $\lambda_2 \leq 20\lambda_1$. For example $\lambda_2 = 6\lambda_1$ in FIG. 4. In general, $\lambda_2$ is an integral function of $\lambda_1/2$, and the burst may be in phase with the waveform $W_2$, to minimize any, albeit temporary, DC component arising. Thus, for example, when $f_1$ is 100 Hz, the value of $1/\lambda_2$ ($f_2$) may be, for example, about 100/6 Hz.

The pulses $P_1$, $P_2$, etc., within the bursts B have a wavelength $\lambda_3$, which is less than $\lambda_1$. The ratio $\lambda_3/\lambda_1$ can be from 0.01 to 1, e.g., less than 1/3. In one embodiment the ratio $\lambda_3/\lambda_1$ is about 0.1. $\lambda_3$ may correspond, for example, to a frequency $f_3$ of at least about 1000 Hz, e.g. from about 1000-3000 Hz or higher. In one embodiment, the width $T_p$ of each high intensity pulse $P_1$, $P_2$, etc., is substantially less than the width T of each of the background pulses P. In one embodiment, the ratio $R_t = T_p/T$ is from about 0.05-0.3, e.g., $\leq 0.2$.

Without being bound by any particular theory, it is considered that the high intensity pulses disturb the discharge in such a way as to lower the color temperature change of the lamp output. In particular, the current pulses shift the dose equilibrium and increase the cold spot temperature. Accordingly, at dimmed power, the output is shifted from a slightly blue hue to a warmer (slightly redder) hue. For example, the CCT may be reduced by at least about 50K. e.g., at least 100K and in some embodiments, at least 200K or at least 500K, at a dimming level of 50% from what it would otherwise be without the pulses.

Figure 6:
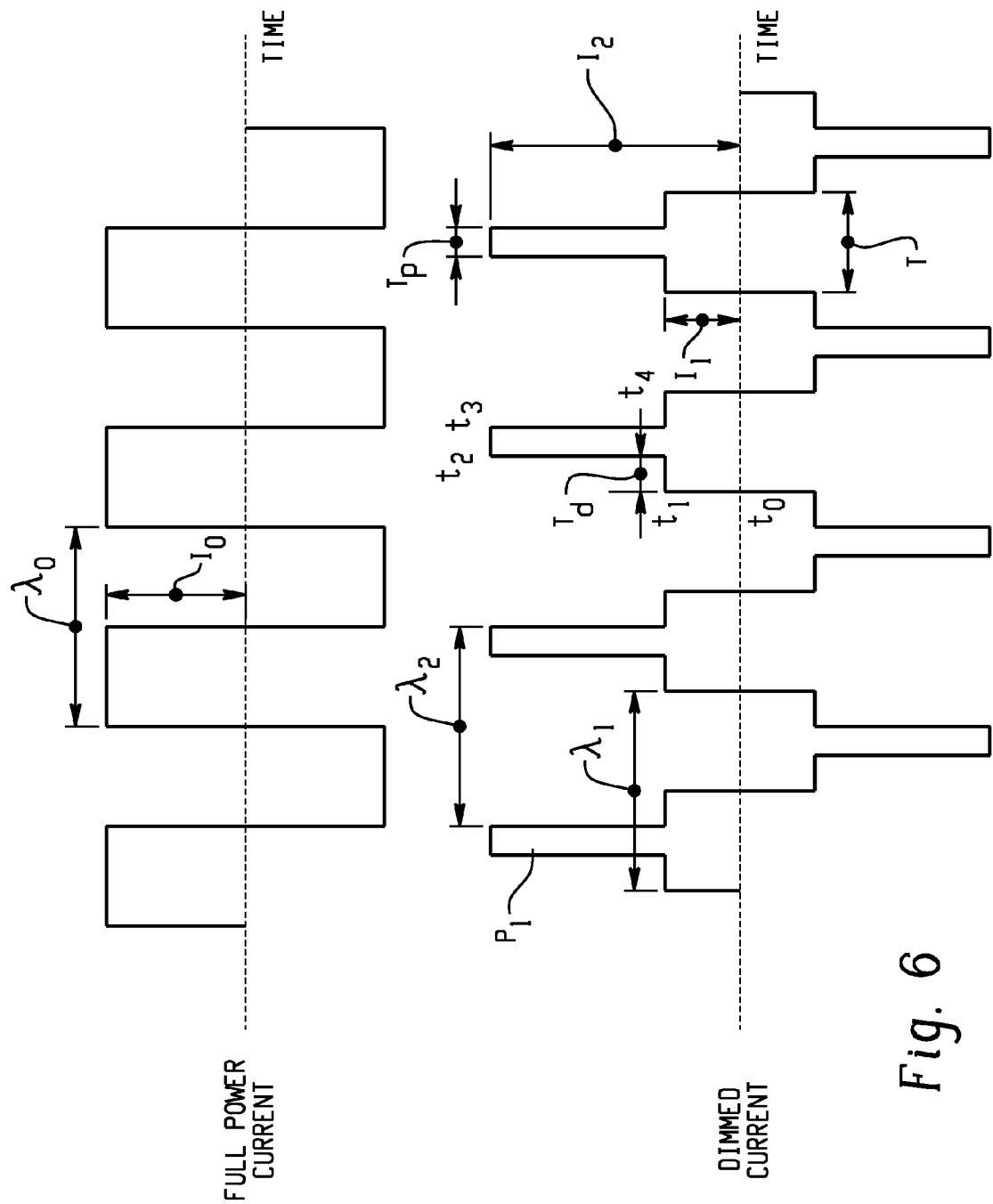
FIG. 6 illustrates a schematic plot of a second exemplary waveform for operating the exemplary lamp at less than full power in a dimming mode, with the full power waveform shown above, for reference.
Figure 7:
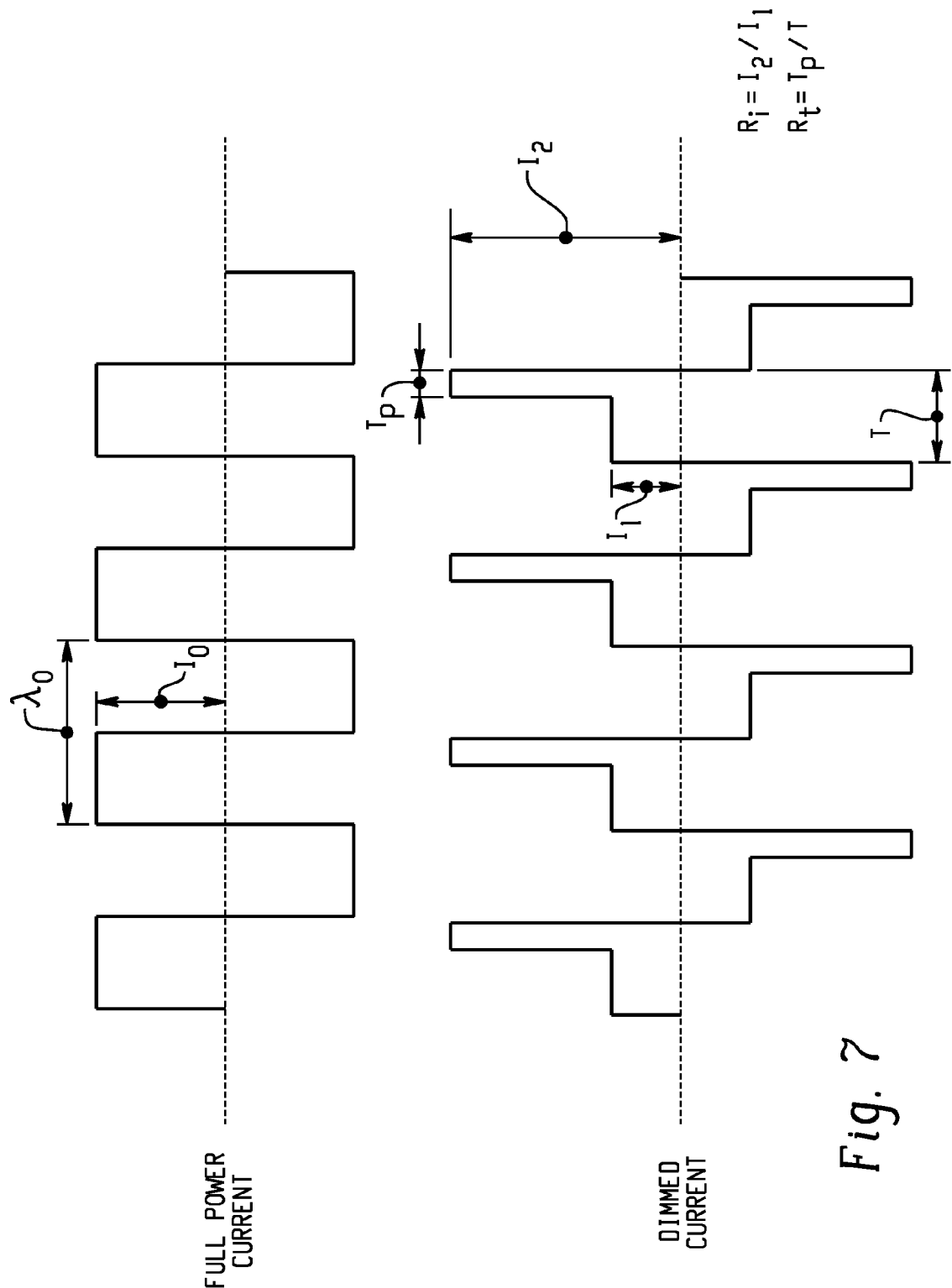
FIG. 7 illustrates a schematic plot of a third exemplary waveform for operating the exemplary lamp at less than full power in a dimming mode, with the full power waveform shown above, for reference.
Figure 8:
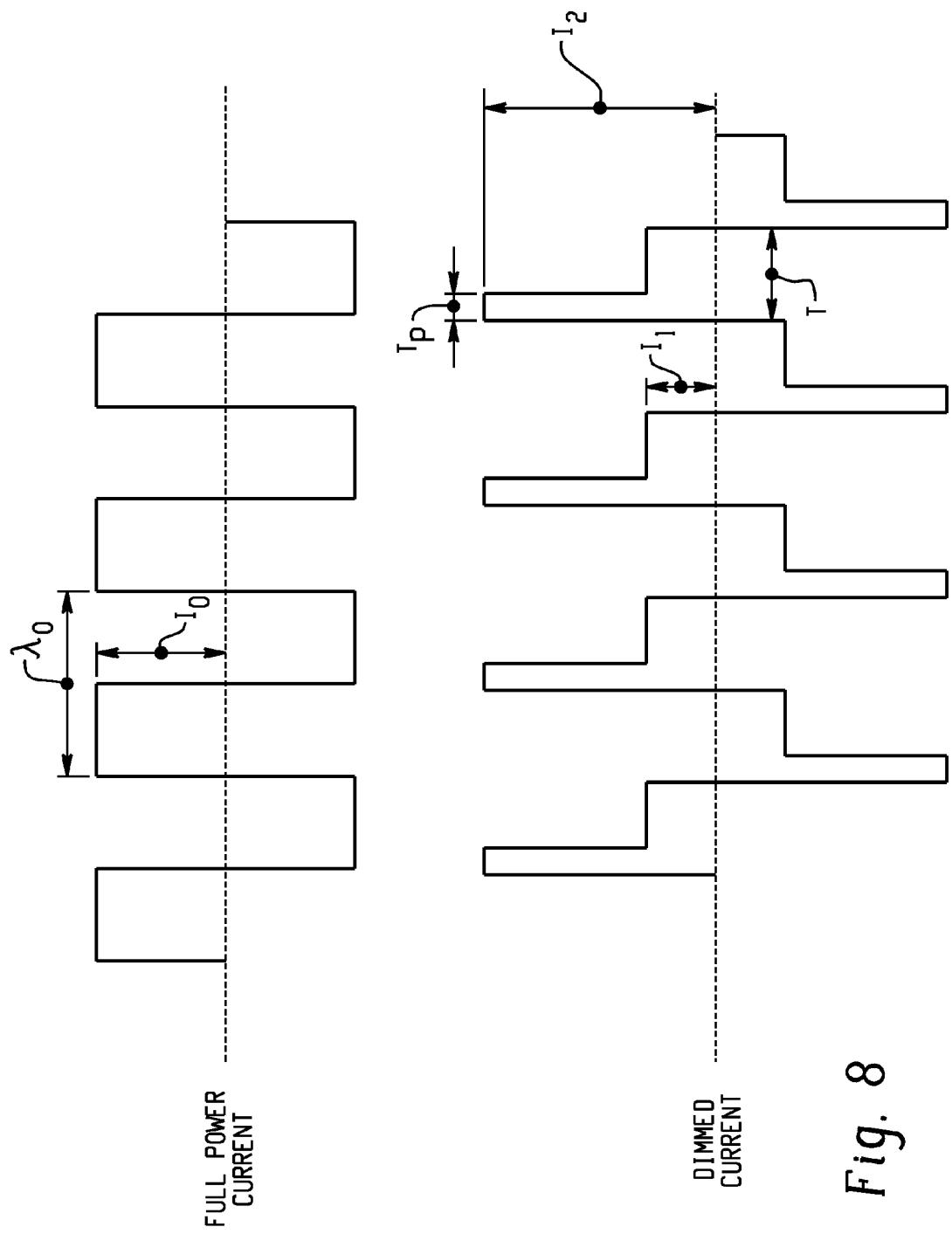
FIG. 8 illustrates a schematic plot of a fourth exemplary waveform for operating the exemplary lamp at less than full power in a dimming mode, with the full power waveform shown above, for reference.

While FIG. 4 illustrates the intensity busts B imposed serially upon an otherwise square waveform, it is also contemplated that the extra current pulses $P_1$ may be added on top of the current waveform, as illustrated in FIGS. 6, 7, and 8. In these embodiments, which may be similar to that of FIG. 4, except as otherwise noted, the high intensity pulse $P_1$ has the same interval as the background waveform, i.e., $\lambda_2 = \lambda_1$. However, other intervals are contemplated. For example, to maintain a constant phase, $\lambda_2$ is an integer function of $\lambda_1$, e.g., $\lambda_2 = 2\lambda_1$. The width $T_p$ of each high intensity pulse is substantially less than the width T of each of the background pulses. For example, the ratio $R_t = T_p/T$ may be a constant and may be, for example, from about 0.05-0.5, e.g., about 0.01-0.3, such as about 0.2.

In FIGS. 6-8, a high intensity pulse $P_1$, which may be a single pulse, is added each half cycle of the background alternating current waveform, i.e., to each positive and each negative current pulse. The high intensity pulse has the same polarity as the pulse of the background waveform. In FIG. 6, the high intensity pulse is added at the middle of the background pulse. The leading edge of the high intensity current pulse commences after a time delay $T_d$ from the leading edge of the half cycle of the respective pulse of the background alternating lamp current, where $T_d$ is less than $\lambda_1/2$. Specifically, in the resulting waveform, the current increases (negatively or positively) after passing through zero from the opposite polarity at time to to an intensity $I_1$ at a first time $t_1$, and at a second time $t_2$, increases to a higher intensity $I_2$ and at a third time $t_3$ decreases to the first intensity $I_1$ and at a third time $t_4$ passes through 0, to be repeated sequentially with a pulse of the opposite polarity. FIG. 7 is similar to FIG. 6, except that the high intensity pulse occurs at the end of the background pulse, such that the intensity thereafter switches to the opposite polarity after passing through 0. In FIG. 8, the high intensity pulse occurs at what would otherwise be the beginning of each background pulse. As will be appreciated, the high intensity pulses need not be applied to every background pulse but may be spaced by a number of cycles of the background waveform only.

Figure 9:
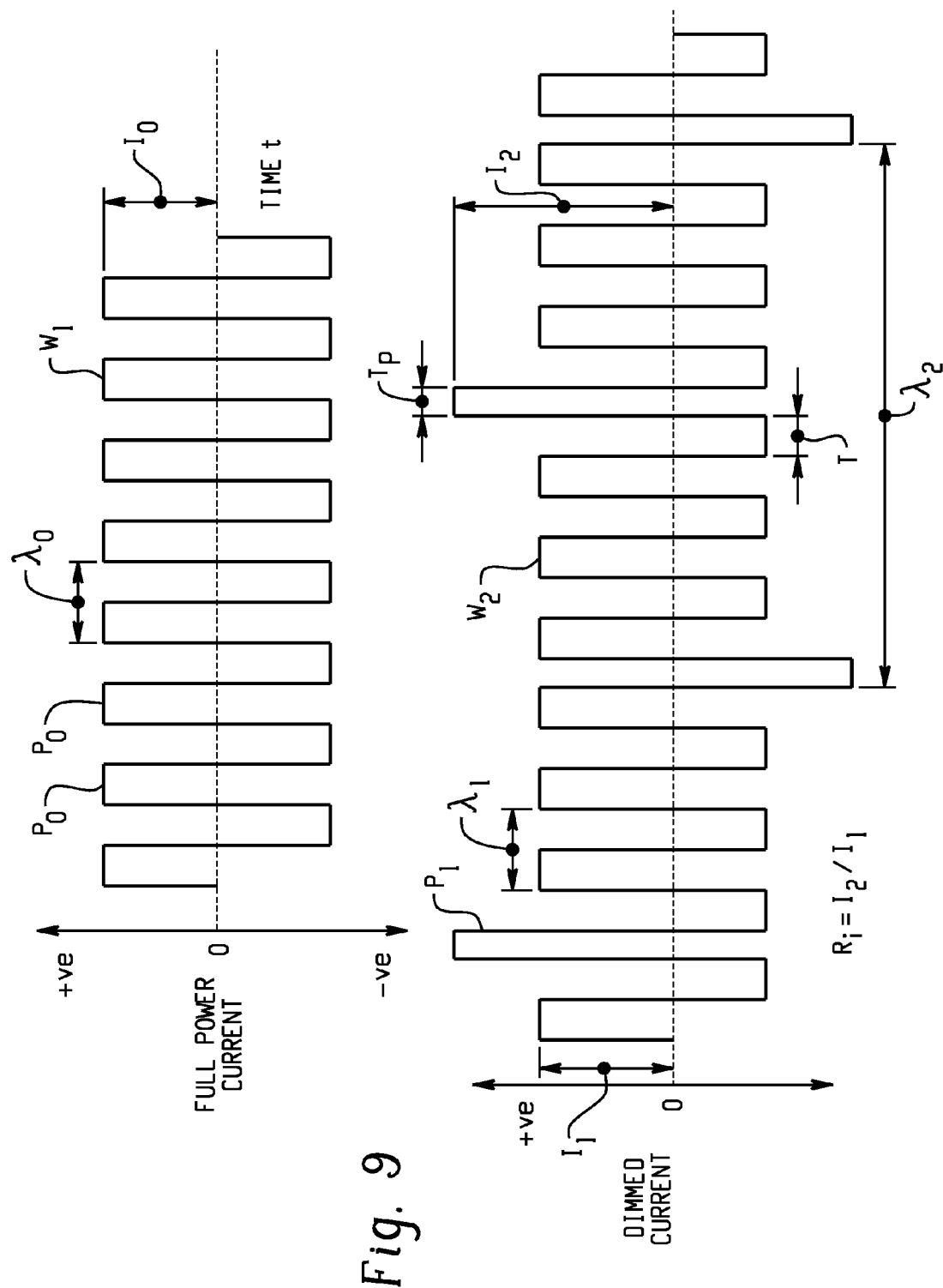
FIG. 9 illustrates a schematic plot of a fifth exemplary waveform for operating the exemplary lamp at less than full power in a dimming mode, with the full power wave form shown above, for reference.

In another embodiment, shown in FIG. 9, which is similar to the embodiment of FIG. 4, except as noted, a single high intensity pulse $P_1$ instead of a burst of pulses, is introduced periodically to the background waveform. The pulse has a wavelength $\lambda_2$ and an intensity $I_2$ which can have the same values as for FIG. 4. In this embodiment, the duration of the high intensity pulse $T_p < T$ (the duration of the half cycle of the background waveform). In one embodiment, $\lambda_2 < 10 \lambda_1$. The exemplary dimming cycle avoids a DC component by providing one positive pulse and one negative pulse in a period of $\lambda_2$. Accordingly, if the current is integrated in the period of $\lambda_2$, the net current is zero. In this embodiment, first and second high intensity pulses of opposite polarity may be spaced by from two to about 10 pulses of alternating polarity of the background waveform.

While FIGS. 4 and 6-10 show background waveforms which are of uniform frequency, it is also contemplated that the frequency of the background waveform may be varied, for example by periodically sweeping the frequency between maximum and minimum values (first gradually increasing, then gradually decreasing the frequency). For example, the frequency may be swept between about 500 Hz and about 1000 Hz. In this embodiment, the average wavelength $\lambda_{1AV}$ and optionally also the maximum wavelength $\lambda_{1MAX}$ of the background pulse can be less than the wavelength $\lambda_2$ of the high intensity pulses.

Figure 10:
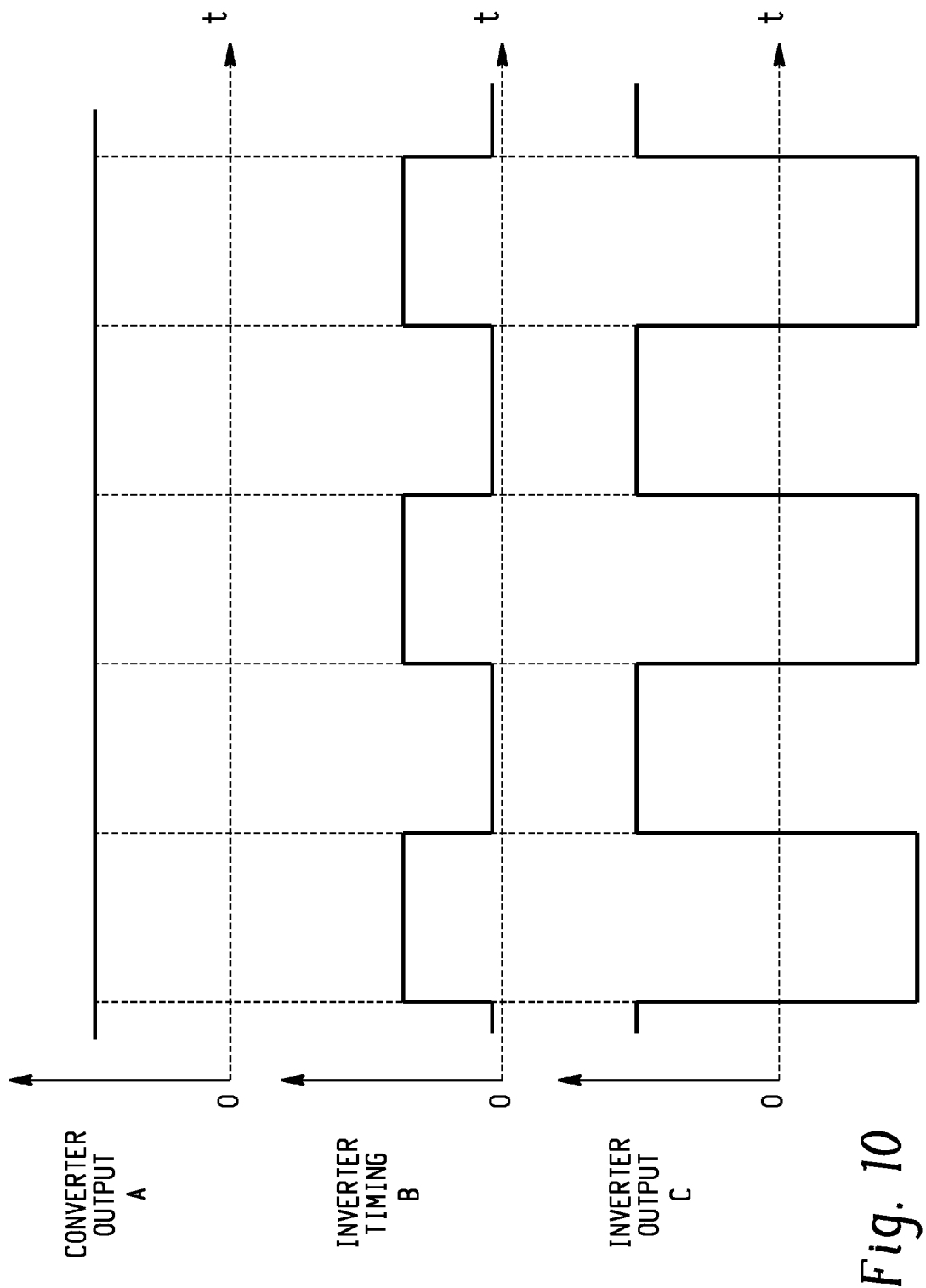
FIG. 10 illustrates exemplary plots of the AC/DC converter output, inverter timing, and inverter output, vs. time, for the exemplary ballast circuit of FIG. 2 for generation of a full power waveform.
Figure 11:
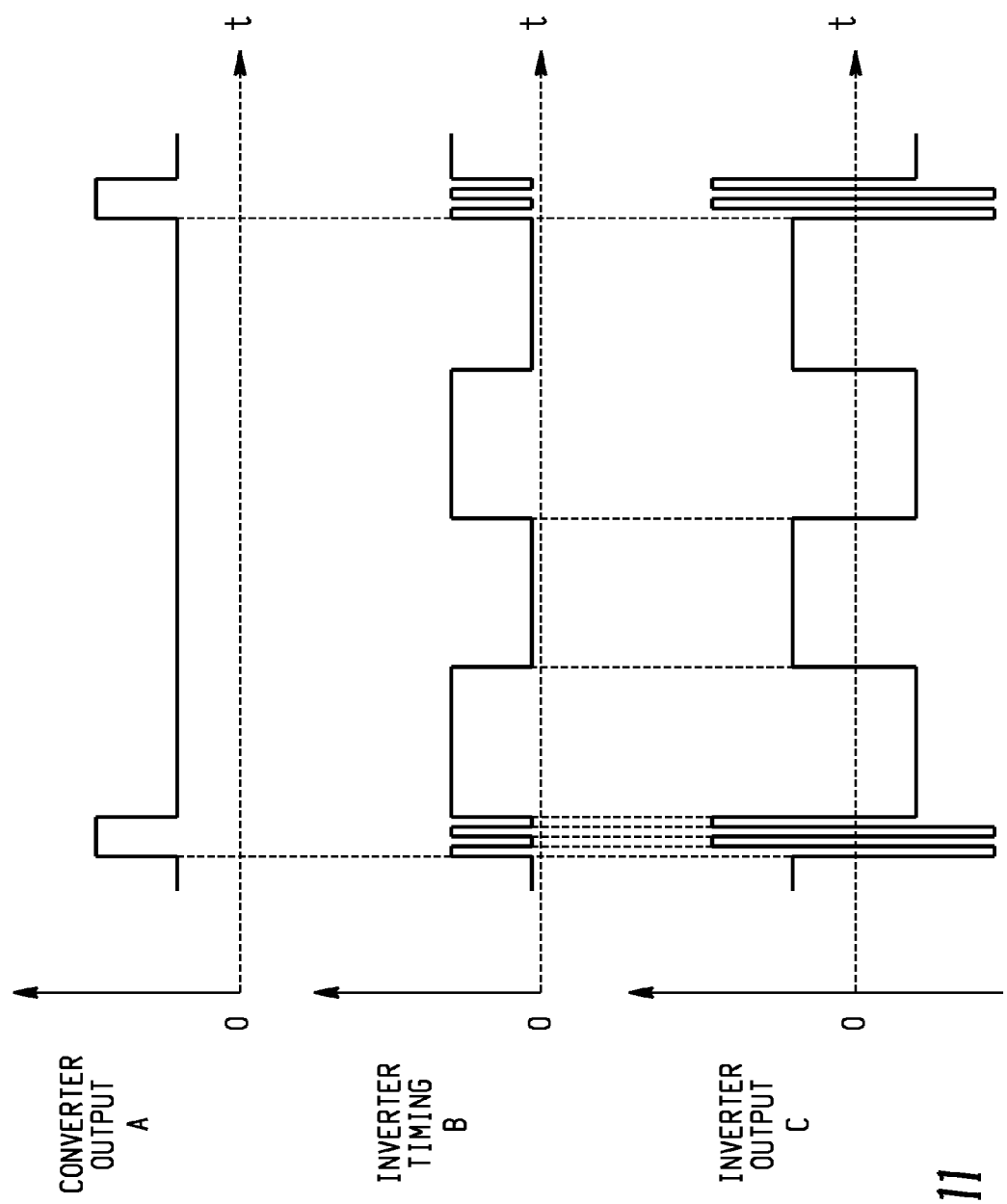
FIG. 11 illustrates exemplary plots of the AC/DC converter output, inverter timing, and inverter output, vs. time, for the exemplary ballast circuit of FIG. 2 for generation of a dimming waveform in accordance with a first aspect of the exemplary embodiment.
Figure 12:
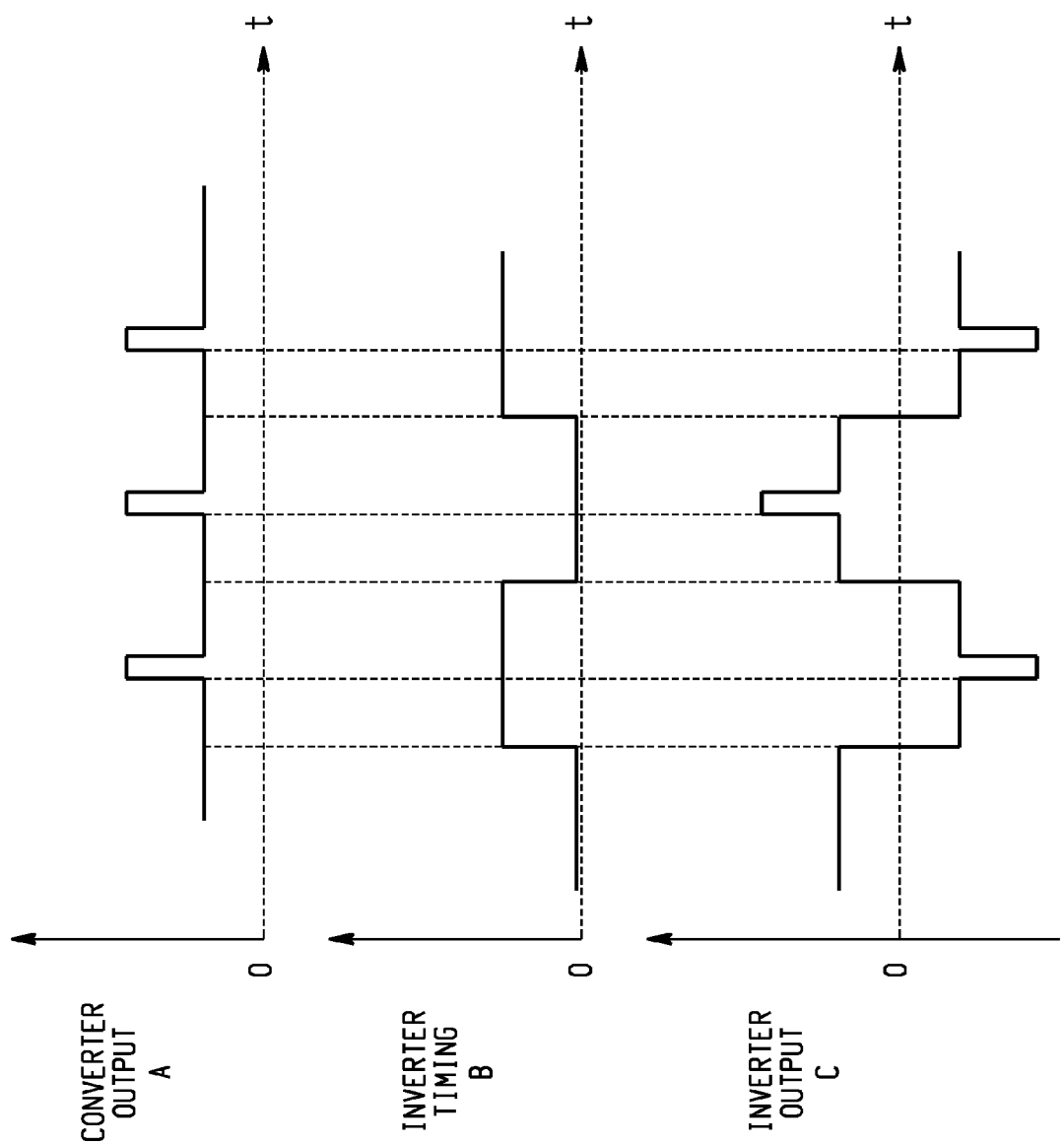
FIG. 12 illustrates exemplary plots of the AC/DC converter output, inverter timing, and inverter output, vs. time, for the exemplary ballast circuit of FIG. 2 for generation of a dimming waveform in accordance with a second aspect of the exemplary embodiment.
Figure 13:
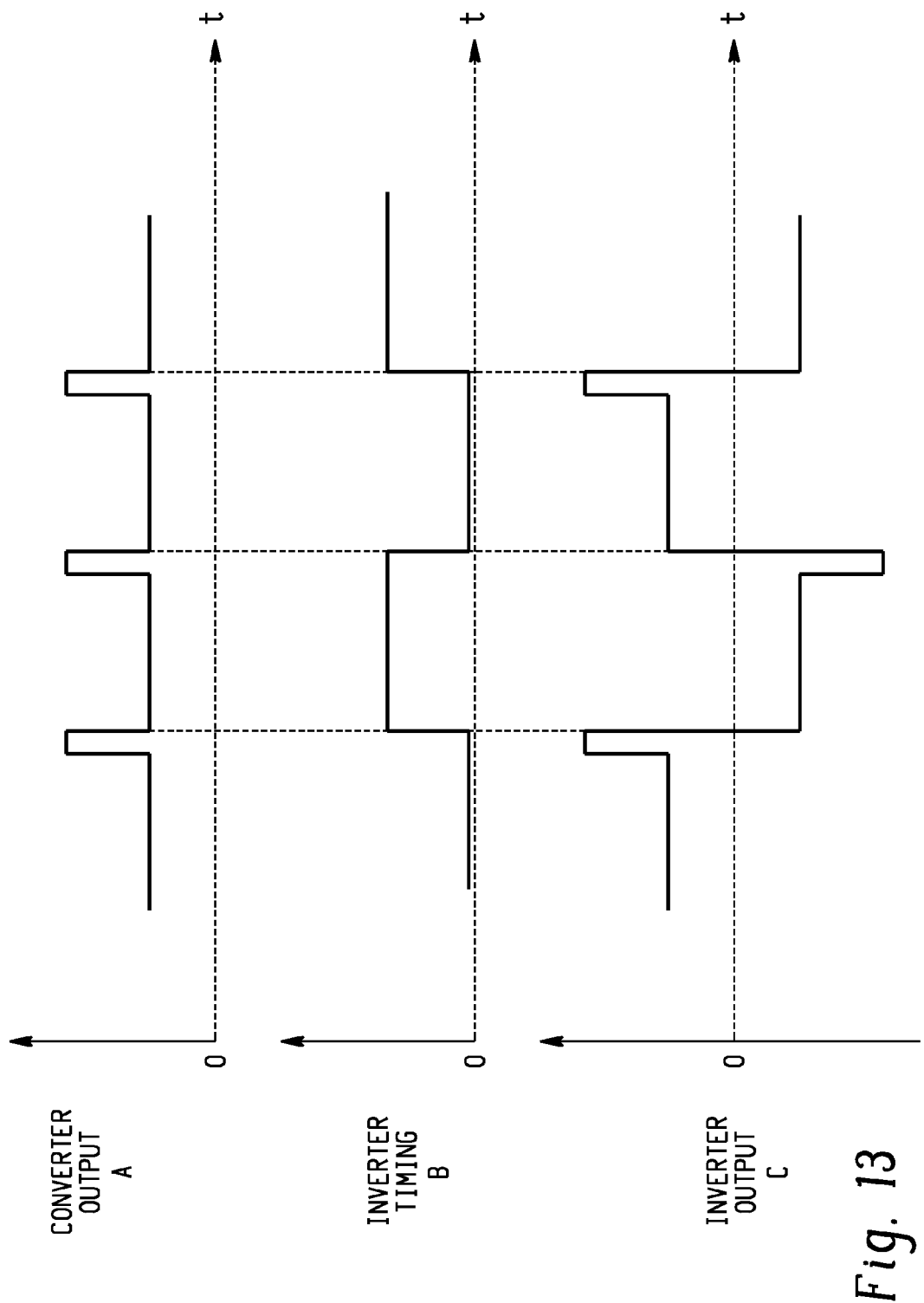
FIG. 13 illustrates exemplary plots of the AC/DC converter output, inverter timing, and inverter output, vs. time, for the exemplary ballast circuit of FIG. 2 for generation of a dimming waveform in accordance with a third aspect of the exemplary embodiment.

FIG. 10 illustrates, for the circuit shown in FIG. 2, the output of the AC/DC converter, inverter timing and inverter output for producing a full power waveform of the type shown in FIG. 3. FIG. 11 illustrates, for the circuit shown in FIG. 2, the output of the AC/DC converter, inverter timing and inverter output for producing a dimming waveform of the type shown in FIG. 4. FIG. 12 illustrates, for the circuit shown in FIG. 2, the output of the AC/DC converter, inverter timing and inverter output for producing a dimming waveform of the type shown in FIG. 6. FIG. 13 illustrates, for the circuit shown in FIG. 2, the output of the AC/DC converter, inverter timing and inverter output for producing a dimming waveform of the type shown in FIG. 7.

Figure 14:
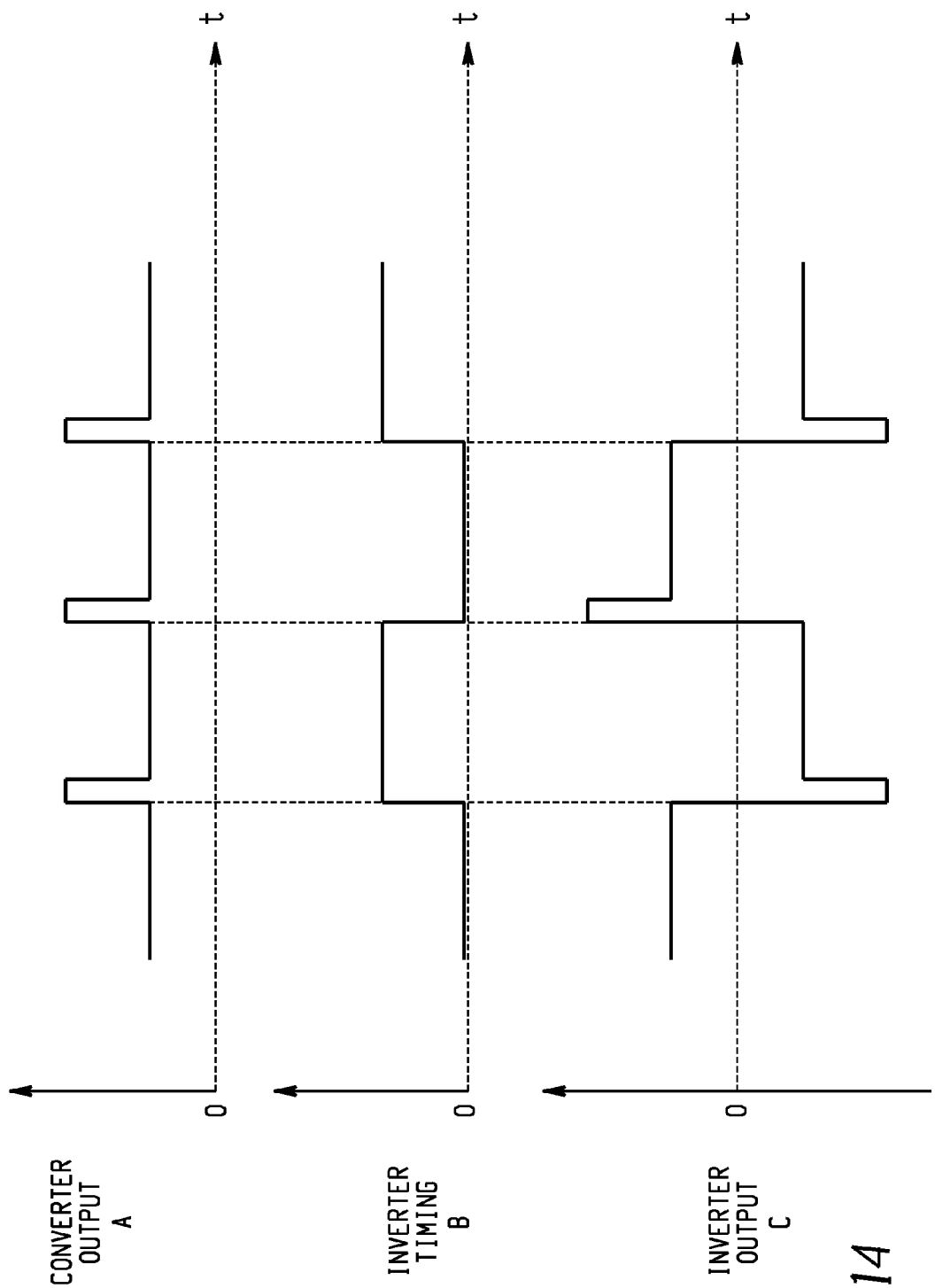
FIG. 14 illustrates exemplary plots of the AC/DC converter output, inverter timing, and inverter output, vs. time, for the exemplary ballast circuit of FIG. 2 for generation of a dimming waveform in accordance with a fourth aspect of the exemplary embodiment.
Figure 15:
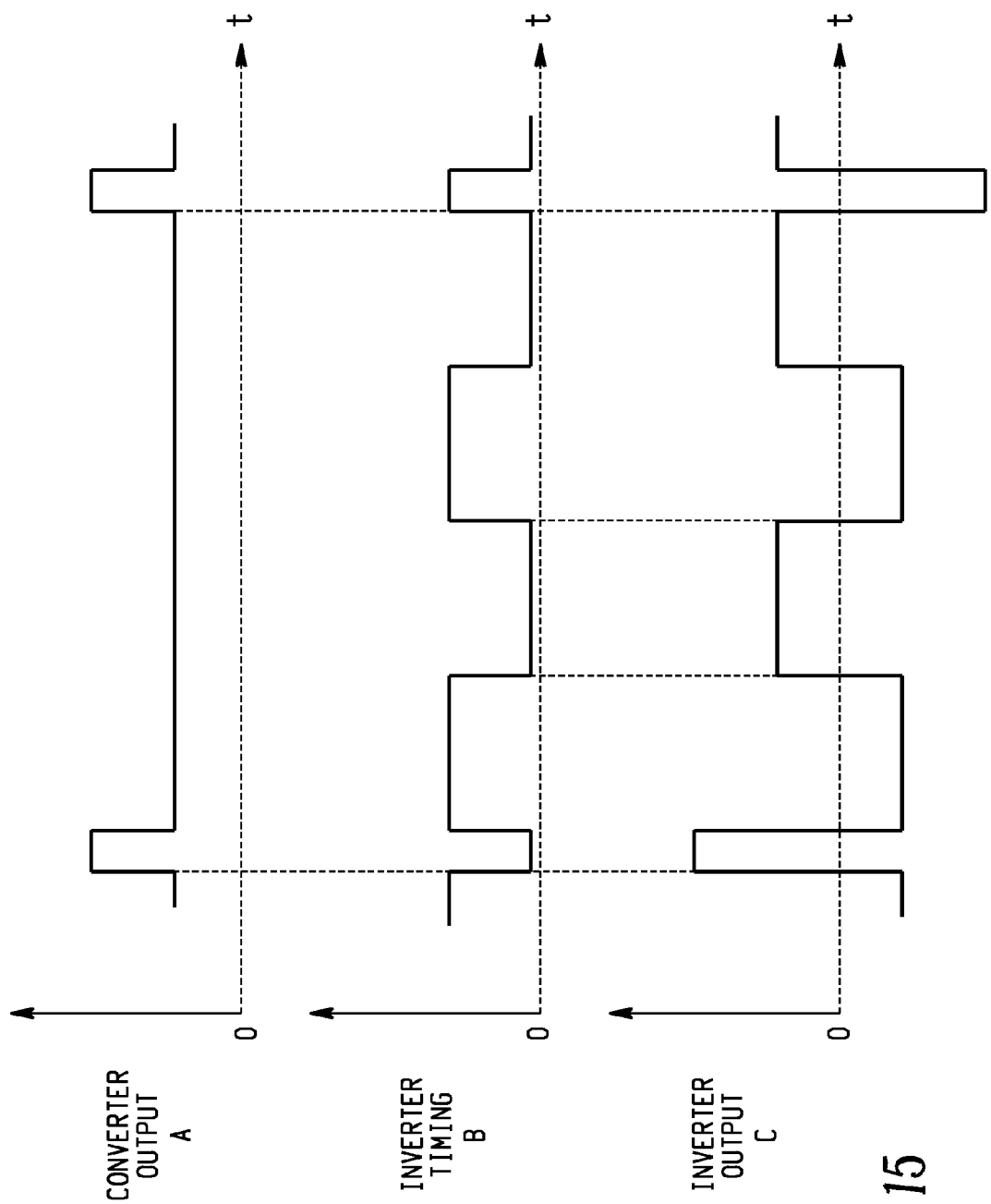
FIG. 15 illustrates exemplary plots of the AC/DC converter output, inverter timing, and inverter output, vs. time, for the exemplary ballast circuit of FIG. 2 for generation of a dimming waveform in accordance with a fifth aspect of the exemplary embodiment.

FIG. 14 illustrates, for the circuit shown in FIG. 2, the output of the AC/DC converter, inverter timing and inverter output for producing a dimming waveform of the type shown in FIG. 8. FIG. 15 illustrates, for the circuit shown in FIG. 2, the output of the AC/DC converter, inverter timing and inverter output for producing a dimming waveform of the type shown in FIG. 9.

In the illustrated embodiments, the background waveform in the dimming mode has a constant frequency and wavelength. In other embodiments, the wavelength $\lambda_1$ and frequency $f_1$ of the background waveform may vary with time, which will be referred to as pulsing and sweeping dimming. For example, the background square waveform varies between a lower frequency and a higher frequency, e.g., in a predetermined wavelength range between about 100 Hz and 1000 Hz, such as between 500 Hz and 900 Hz. The square waveform frequency $f_1$ thus starts at 500 Hz and gradually increases to 900 Hz, e.g., at a step size of 100 Hz, although smaller or larger step sizes are also contemplated. For example, the frequency $f_1$ is stepped at 500, 600, 700, 800 and 900 Hz. After the square waveform frequency $f_1$ reaches 900 Hz, it is gradually reduced from 900 Hz to 500 Hz in equal steps of, for example, 100 Hz (i.e., 900, 800, 700, 600 and 500 Hz). The sweeping thus described is repeated cyclically. One reason for the sweeping is to disturb the chemistry all the time and avoid letting it settle to an equilibrium point.

Figure 16:
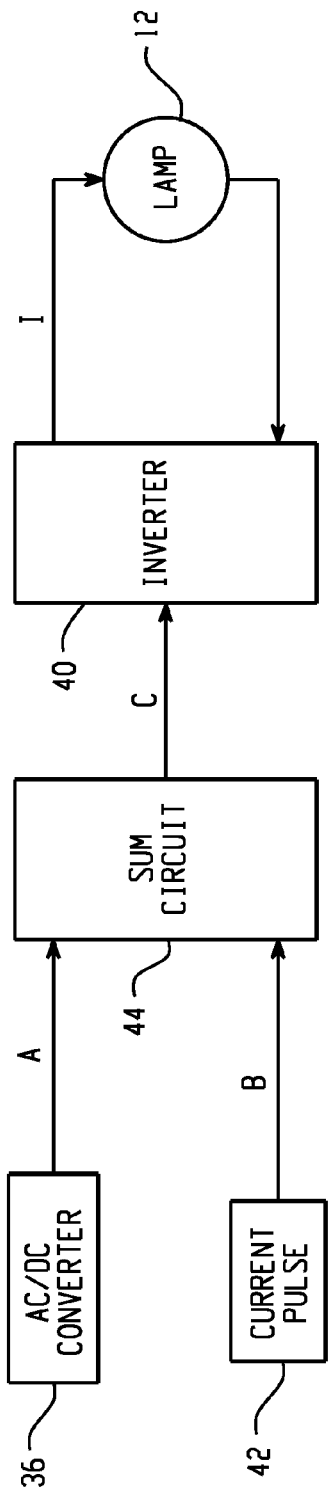
FIG. 16 is a schematic representation of a second embodiment of the ballast circuit of FIG. 1.
Figure 17:
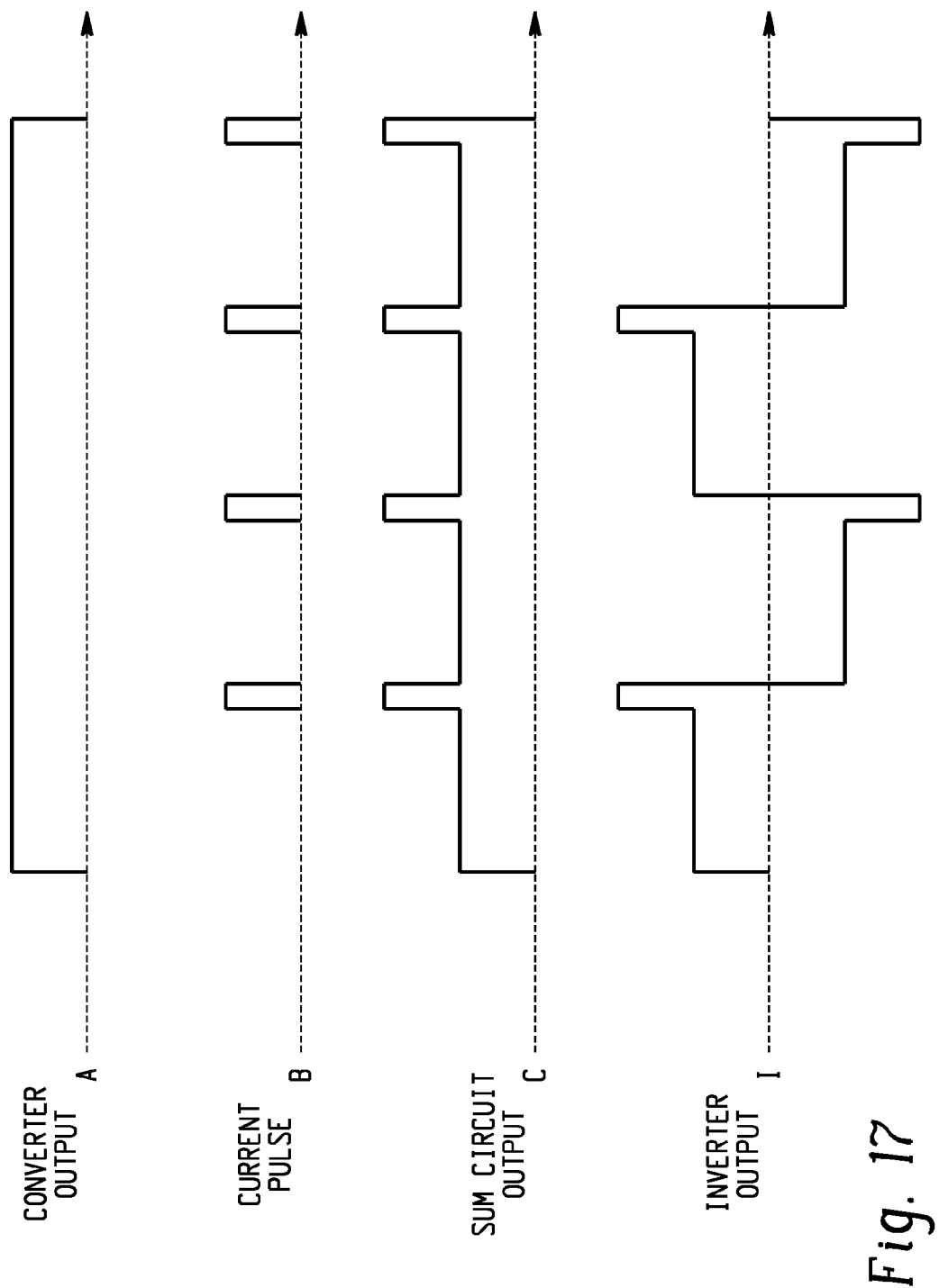
FIG. 17 illustrates exemplary plots of the AC/DC converter output, current pulse, sum circuit output, and inverter output, vs. time, for the exemplary ballast circuit of FIG. 16 for generation of a dimming waveform in accordance with a third aspect of the exemplary embodiment.

FIG. 16 illustrates an alternative ballast circuit for producing a full power and dimming modes for the lamp. In FIG. 16, the output A of an AC/DC converter 36 and output B of a current pulse source 42, such as a pulse generator, are input to a sum circuit 44 which provides a combined output C. The combined output C is input to an inverter 40 which in turn supplies an output waveform I to the lamp 12. FIG. 17 illustrates how the waveform of FIG. 7 may be formed with the ballast circuit of FIG. 16, as an example.

Figure 18:
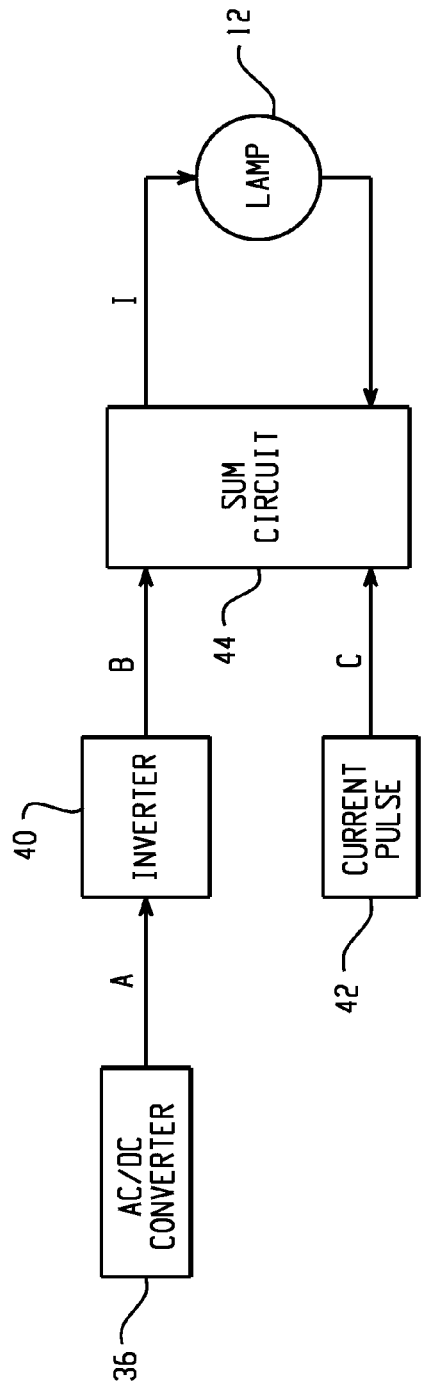
FIG. 18 is a schematic representation of a third embodiment of the ballast circuit of FIG. 1.

FIG. 18 illustrates another alternative ballast circuit for producing a full power and dimming modes for the lamp. In FIG. 18, the inverter 40 inverts only the AC/DC converter output A. The inverter output B and current pulse C are input to a sum circuit 44 which combines the B and C waveforms to provide the waveform I for driving the lamp 12. FIG. 19 illustrates how a waveform may be formed with the ballast circuit of FIG. 18. In this dimming waveform, a burst of high intensity pulses, analogous to that illustrated in FIG. 4, is imposed periodically on a background waveform at every half cycle of the background waveform, i.e., $\lambda_2 = \frac{1}{2}\lambda_1$. Without intending to limit the scope of the exemplary embodiment, the following examples demonstrate the effectiveness of the exemplary ballast circuit.

EXAMPLES

Figure 20:
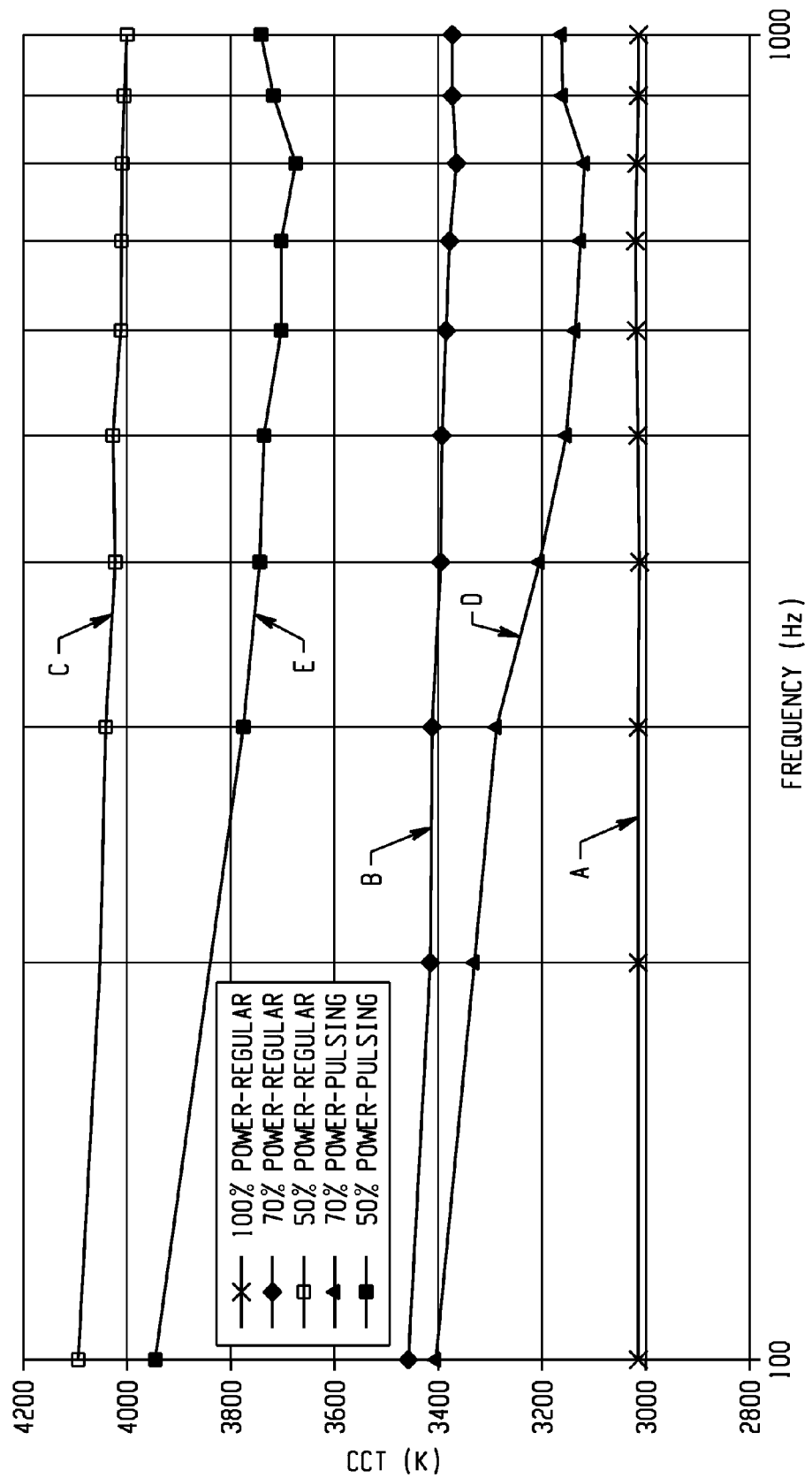
FIG. 20 illustrates a plot of corrected color temperature (CCT) vs. frequency for a ceramic metal halide lamp operating at full power (70 W) when a square waveform is applied of the type illustrated in FIG. 3, and for the same lamp operating at less than full power (49 W or 35 W) with either a "square" waveform (a repeating square wave waveform of the same frequency but lower magnitude than the full power waveform) or a "pulse" waveform (a waveform of the type illustrated in FIG. 4)

A ceramic metal halide lamp 12 of a nominal power of 70 W and an ionizable fill (metal halide and rare earth halide, and buffer gas, etc.) designed to have a correlated color temperature of 3000K at full power was driven by a ballast circuit 10 of the type illustrated in FIG. 2. The ballast circuit was configured to provide a commutated DC square wave of the type illustrated in FIG. 3 at full power. The spectral distribution of the lamp output was measured at each of a set of frequencies $f_0$ in the range of 100 to 1000 Hz. From the spectral power distribution, the CCT of the lamp was determined. As shown in FIG. 20, the CCT of the lamp at full power remained relatively constant at about 3000K over the range of frequencies investigated. The following plots are shown in FIG. 20:

A: Full power, 70 W

B: Dimming with square wave, no high intensity pulse, 49 W, i.e., about 70% of full power (comparative example)

C: Dimming with square wave, no high intensity pulse, 35 W i.e., about 50% of full power (comparative example)

D: Square wave with high intensity pulse burst as shown in FIG. 4, 49 W, i.e., about 70% of full power, Ri=3.0

E: Square wave with high intensity pulse burst as shown in FIG. 4, 35 W, i.e., about 50% of full power, Ri=3.0

As seen in FIG. 20, when the power was reduced from 70 W to dimmed power (49 W or 35 W) by simply changing the intensity of the square wave while keeping the frequency the same ($f_1 = f_0$), the lamp CCT increased substantially (plots B and C). The change was most noticeable at the lower wattage (plot C), with CCTs up to 1000K greater than at full power. When a burst of pulses was periodically imposed on these low power square waves analogous to that illustrated in FIG. 4 (plots D and E), there was a marked improvement in that the CCT more closely approximated the full power CCT than the corresponding square wave alone. For these plots, the frequency represents the frequency of the background waveform in the dimming mode $f_2$ ($1/\lambda_2$). The frequency has a significant effect on the degree of improvement, with frequencies $f_2$ in the range of 700-800 Hz providing the closest approximations to full power.

Figure 21:
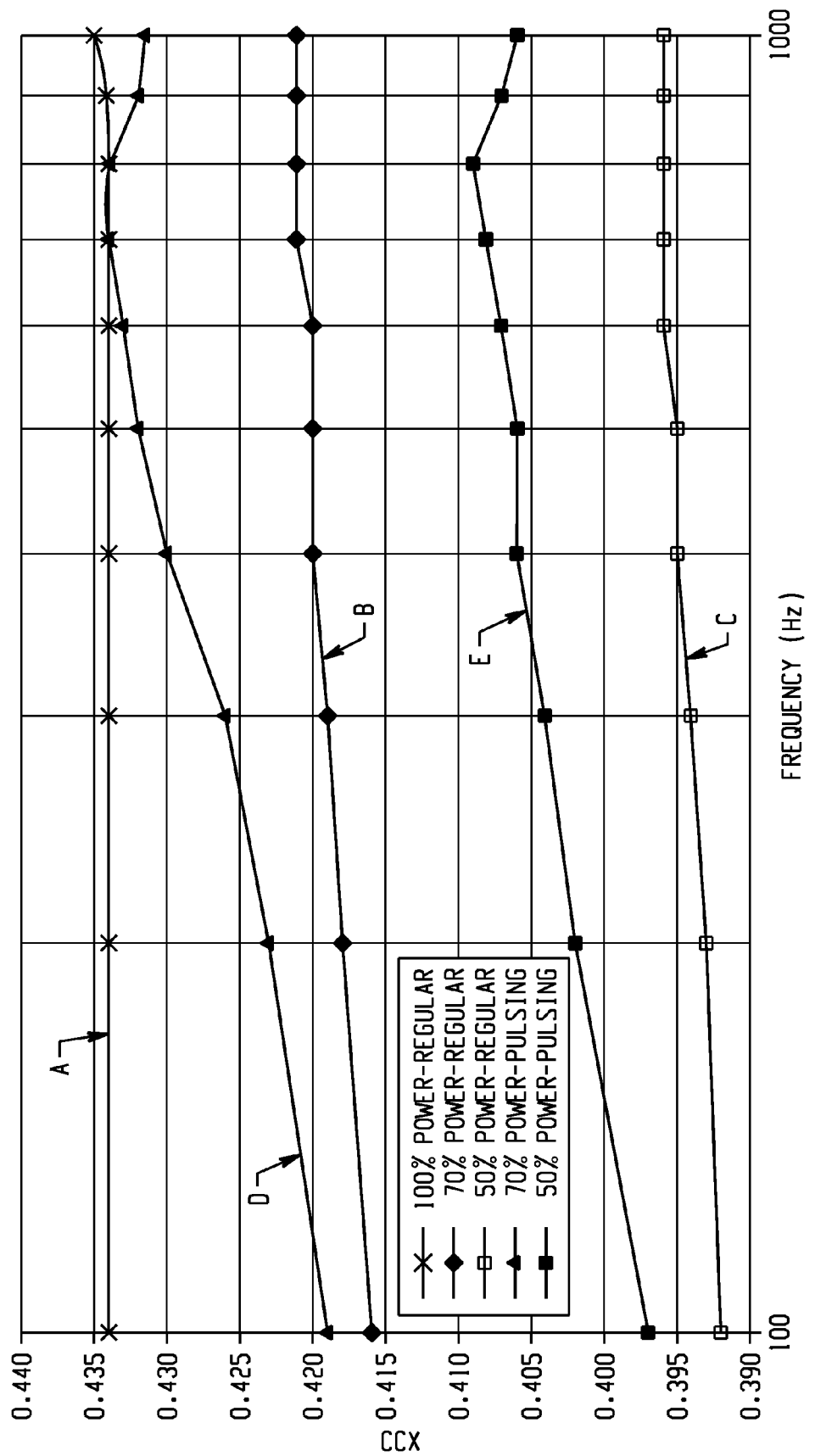
FIG. 21 illustrates a plot of ccx vs. frequency for a ceramic metal halide lamp under the same operating conditions as for FIG. 20, where ccx is the value on the X axis on a standard CIE (Commission Internationale de l'Eclairage) chromaticity diagram in which the chromaticity coordinates X and Y represent relative strengths of two of the three primary colors.
Figure 22:
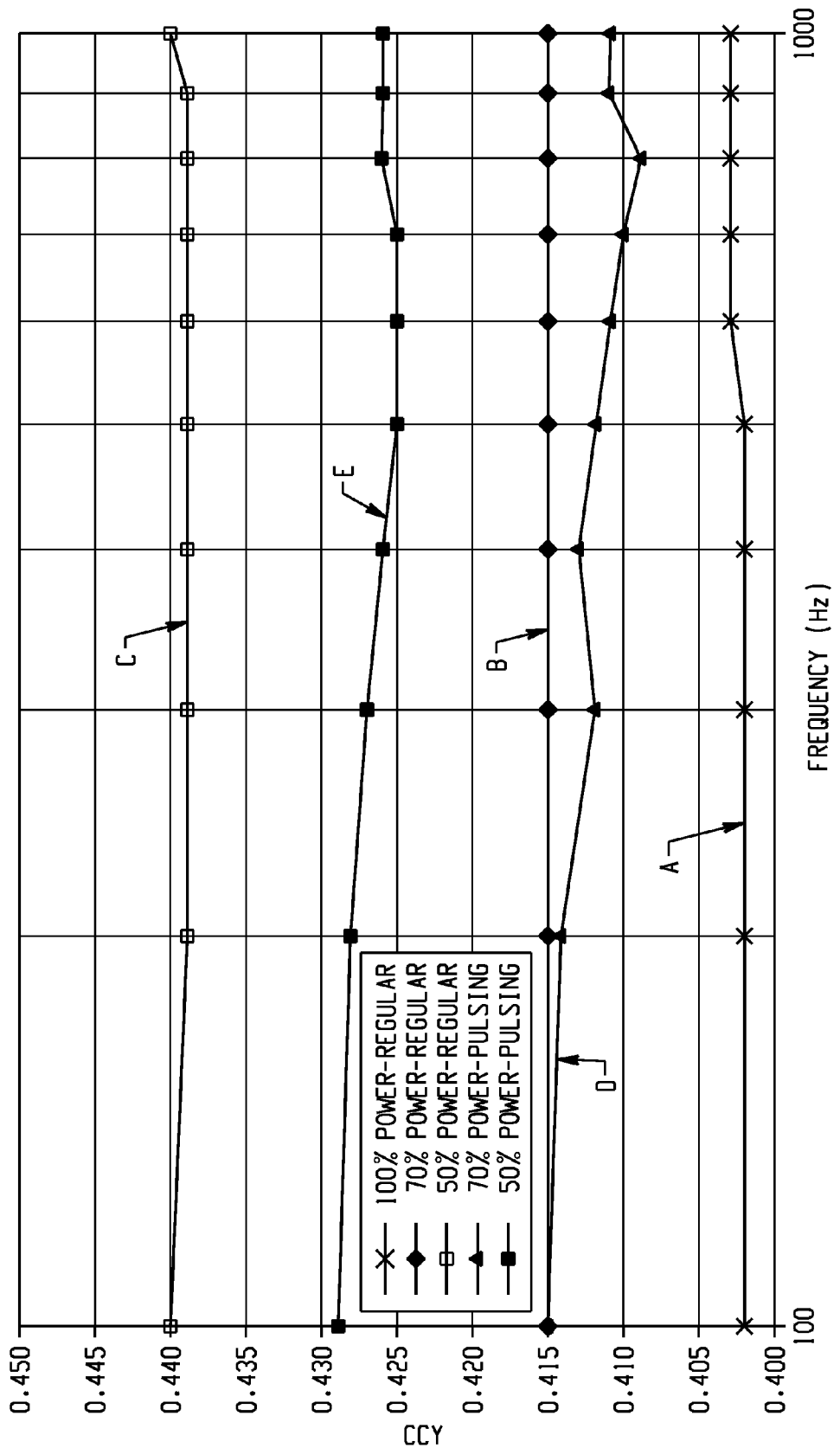
FIG. 22 illustrates a plot of ccy vs. frequency for a ceramic metal halide lamp under the same operating conditions as for FIG. 20, where ccy is the value on the Y axis on the standard CIE chromaticity diagram.

With reference to FIG. 21 and FIG. 22, the corresponding ccx and ccy values for the lamp operating conditions of FIG. 20 are shown. In general, frequency has more of an influence on ccx than ccy, with ccy values being less affected by changes in frequency.

Figure 23:
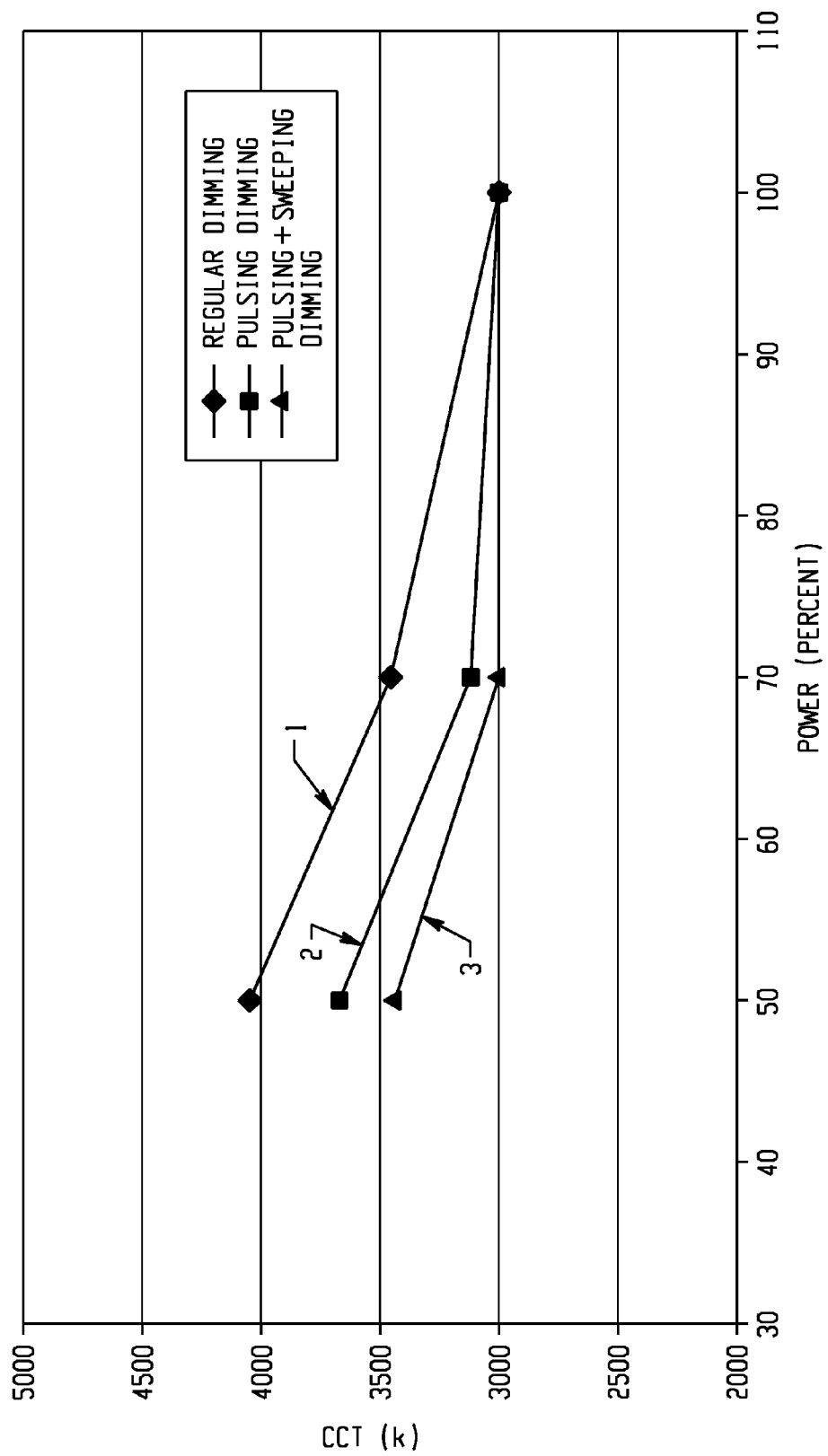
FIG. 23 is a plot of lamp power vs. color temperature for square wave (conventional) dimming, pulse waveform dimming, and pulse waveform dimming in which the background waveform frequency is swept for the operating conditions shown in FIG. 20.

FIG. 23 employs the same data for the lamp with nominal 70 W power to show the CCT of the lamp as a function of operating power at a frequency of 100 Hz for three dimming modes:

1: Regular dimming (as for B and C in FIG. 20)—no high intensity pulses.

2: Pulsing dimming (as for D and E in FIG. 20)—the waveform has the high intensity pulses and the background square waveform frequency $f_2$ is fixed at a value between 700 Hz and 800 Hz.

3: Pulsing+Sweeping Dimming as for 2, but the background square waveform frequency $f_2$ is varied by sweeping in the range from 500 Hz to 900 Hz in equal step sizes of 100 Hz, By doubling the disturbance, the CCT can be further improved as shown in the plot.

Figure 24:
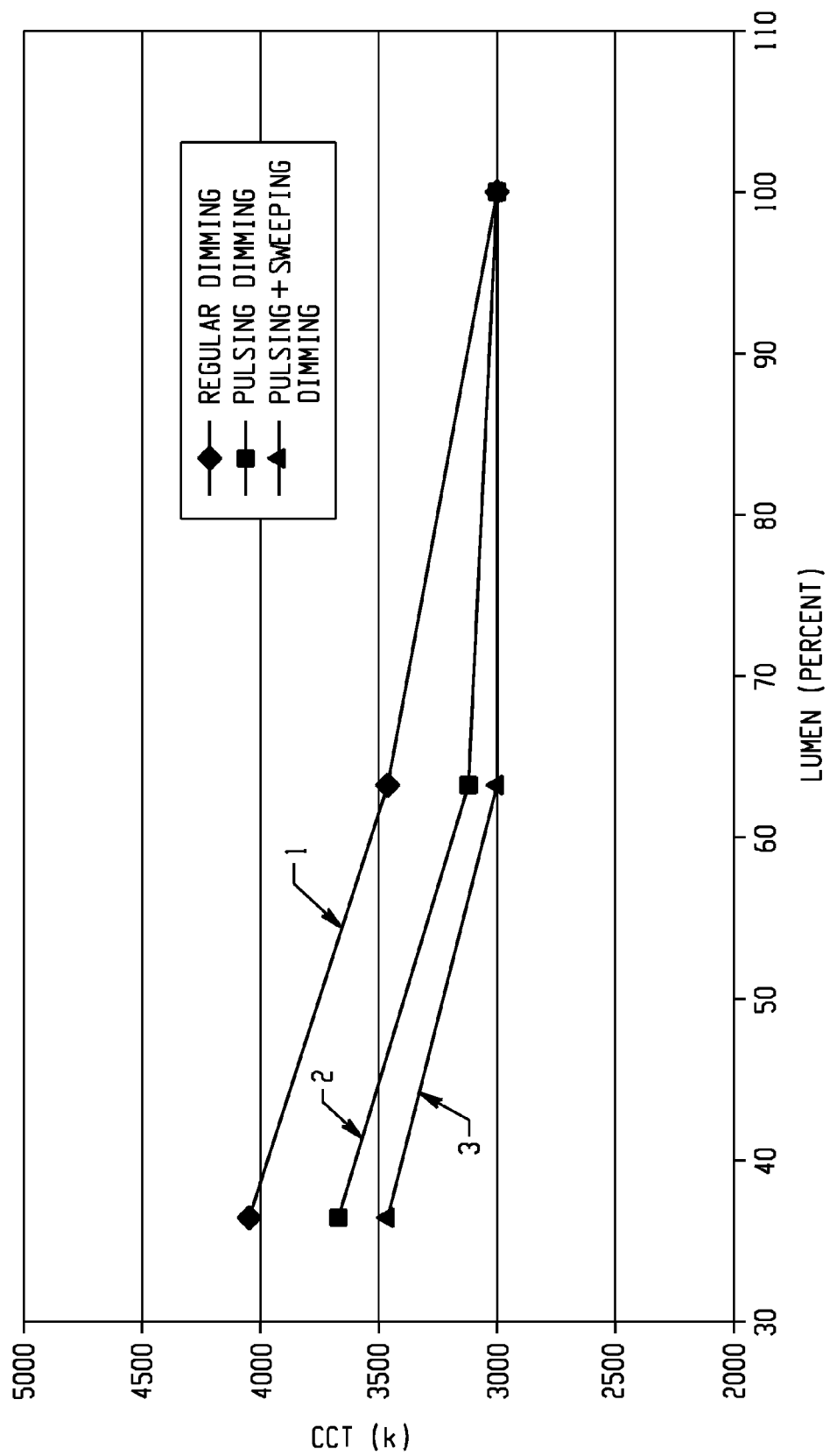
FIG. 24 is a plot of lumen output, as a percentage of the lumen output at full power vs. color temperature for square wave (conventional) dimming, pulse waveform dimming, and pulse waveform dimming in which the background waveform frequency is swept for the operating conditions shown in FIG. 20.

FIG. 24 shows data for the lamp with nominal 70 W power to show the % lumen of the lamp as a function of operating power for the three dimming modes of FIG. 23.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A lamp ballast circuit comprising:
a nominal power mode for driving a high intensity discharge lamp at a nominal power, the lamp ballast circuit configured to generate a first alternating current waveform during the nominal power mode having a first intensity $I_0$; and
a reduced power dimming mode for driving the lamp at less than the nominal power, the lamp ballast circuit configured to generate a background alternating current waveform having a second intensity $I_1$ which is less than $I_0$, and which is perturbed at intervals by a high intensity current pulse having a third intensity $I_2$ which is greater than $I_1$,
wherein a ratio, $R_i$, of $I_2:I_1$ satisfies the expression $1 < R_i \leq 4$.

2. The lamp ballast circuit according to claim 1, wherein a ratio of the third intensity to the second intensity is at least 1.5.

3. The lamp ballast circuit according to claim 1, wherein the reduced power mode has substantially no dc component.

4. The lamp ballast circuit according to claim 1, wherein the high intensity pulse has a shorter duration than pulses of the background waveform.

5. The lamp ballast circuit according to claim 1, wherein the high intensity pulse comprises a plurality of sequential high intensity pulses.

6. The lamp ballast circuit according to claim 5, wherein the high intensity pulses have a frequency which is at least twice a frequency of the background alternating current waveform.

7. The lamp ballast circuit according to claim 6, wherein the high intensity pulses have a frequency which is at least 1000 Hz.

8. The lamp ballast circuit according to claim 5, wherein the background alternating current waveform has a frequency which is at least 500 Hz.

9. The lamp ballast circuit according to claim 5, wherein the background alternating current waveform has a frequency which less than 1000 Hz.

10. The lamp ballast circuit according to claim 1, wherein background alternating current waveform has a frequency which is periodically swept between minimum and maximum frequencies.

11. The lamp ballast circuit according to claim 1, wherein the interval of the high intensity pulse, or group of pulses where there are a plurality of sequential pulses, is at least twice a wavelength of the background alternating current waveform.

12. The lamp ballast circuit according to claim 1, wherein the background alternating current waveform is an alternating square wave.

13. The lamp ballast circuit according to claim 1, wherein the alternating current pulse is a square wave.

14. The lamp ballast circuit according to claim 1, wherein the high intensity pulse is superimposed on a background pulse and is of the same polarity as the background pulse.

15. The lamp ballast circuit according to claim 1, wherein first and second high intensity pulses of opposite polarity are spaced by from two to about 10 pulses of alternating polarity of the background waveform.

16. In combination, a high intensity discharge lamp and the lamp ballast circuit of claim 1.

17. The combination of claim 16, wherein the high intensity discharge lamp comprises a metal halide lamp.

18. The combination of claim 16, wherein the lamp comprises a pair of electrodes which operate at the same temperature in the dimming mode.

19. A lamp ballast circuit comprising:
    a nominal power mode for driving a high intensity discharge lamp at a nominal power, the lamp ballast circuit configured to generate an alternating square waveform during the nominal power mode having a first intensity $I_0$; and
    a reduced power dimming mode for driving the lamp at less than the nominal power, the lamp ballast circuit configured to generate a background alternating square waveform having a second intensity $I_1$ which is less than $I_0$, and which is periodically perturbed by at least one high intensity pulse having a third intensity $I_2$ which is greater than $I_1$, whereby in the dimming mode, the lamp has a correlated color temperature which is closer to that of the lamp in the nominal power mode than the correlated color temperature would be in the absence of the high intensity pulse, and wherein a ratio, $R_i$, of $I_2:I_1$ satisfies the expression:

$1 < R_i \leq 4$.

20. A method of operating a high intensity discharge lamp, comprising:
    in a nominal power mode, driving a high intensity discharge lamp at a nominal power with a first alternating current waveform having a first intensity $I_0$; and
    in a reduced power dimming mode, driving the lamp at less than the nominal power with a background alternating current waveform having a second intensity $I_1$ which is less than $I_0$, and which is perturbed at intervals by a high intensity pulse having a third intensity $I_2$ which is greater than $I_1$, wherein a ratio, $R_i$, of $I_2:I_1$ satisfies the expression:

$1 < R_i \leq 4$.

21. The method according to claim 20, wherein a ratio of the third intensity to the second intensity is at least 1.5.

22. The method according to claim 20, wherein the reduced power dimming mode has substantially no dc component.

23. The method according to claim 20, wherein the high intensity pulse has a shorter duration than pulses of the background waveform.

24. The method according to claim 20, wherein the high intensity pulse comprises a plurality of sequential high intensity pulses.

25. The method according to claim 24, wherein the high intensity pulses have a frequency which is at least twice a frequency of the background alternating current waveform.

26. The method according to claim 25, wherein the high intensity pulses have a frequency which is at least 1000 Hz.

27. The method according to claim 24, wherein the background alternating current waveform has a frequency which is at least 500 Hz.

28. The method according to claim 24, wherein the background alternating current waveform has a frequency which less than 1000 Hz.

29. The method according to claim 20, wherein background alternating current waveform has a frequency which is periodically swept between minimum and maximum frequencies.

30. The method according to claim 20, wherein the interval of the high intensity pulse, or group of pulses where there are a plurality of sequential pulses, is at least twice a wavelength of the background alternating current waveform.

31. The method according to claim 20, wherein the background alternating current waveform is an alternating square wave.

32. The method according to claim 20, wherein the alternating current pulse is a square wave.

33. The method according to claim 20, wherein the high intensity pulse is superimposed on a background pulse and is of the same polarity as the background pulse.

34. The method according to claim 20, wherein first and second high intensity pulses of opposite polarity are spaced by from two to about 10 pulses of alternating polarity of the background waveform.

35. The method according to claim 20, wherein the lamp comprises a pair of electrodes which operate at the same temperature in the dimming mode.

* * * * *